US008038517B2

(12) United States Patent
Shibuya et al.

(10) Patent No.: US 8,038,517 B2
(45) Date of Patent: Oct. 18, 2011

(54) AIR CONDITIONER AND METHOD FOR ASSEMBLING THE SAME

(75) Inventors: Makoto Shibuya, Kanagawa (JP);
Hideyuki Umenaka, Kanawaga (JP);
Tsutomu Nagashima, Kanagawa (JP);
Shinnji Sugiyama, Kanagawa (JP);
Ryouhei Kondo, Kanagawa (JP);
Masato Oda, Kanagawa (JP); Tomomi Takahashi, Kanagawa (JP)

(73) Assignee: Fujitsu General Limited, Kawasaki-shi (JP)

( * ) Notice: Subject to any disclaimer, the term of this patent is extended or adjusted under 35 U.S.C. 154(b) by 1181 days.

(21) Appl. No.: 11/519,019

(22) Filed: Sep. 12, 2006

(65) Prior Publication Data

US 2007/0060036 A1    Mar. 15, 2007

(30) Foreign Application Priority Data

Sep. 13, 2005 (JP) ................. 2005-265644
Oct. 11, 2005 (JP) ................. 2005-296702
Oct. 11, 2005 (JP) ................. 2005-296859
Jan. 19, 2006 (JP) ................. 2006-010741

(51) Int. Cl.
  *B01L 1/04* (2006.01)
(52) U.S. Cl. ........... 454/187; 454/251; 454/237; 62/303
(58) Field of Classification Search .......... 454/187, 454/251, 237, 207; 62/263, 298, 303, 28
See application file for complete search history.

(56) References Cited

U.S. PATENT DOCUMENTS

| 5,980,598 | A  | * | 11/1999 | Horvat | 55/294 |
|-----------|----|---|---------|-------------------|--------|
| 6,729,154 | B2 | * | 5/2004  | Takashima et al.  | 62/317 |
| 7,544,223 | B2 | * | 6/2009  | Oda et al.        | 55/289 |
| 2004/0060314 | A1 | * | 4/2004 | Gunji et al.     | 62/262 |

FOREIGN PATENT DOCUMENTS

| EP | 0 497 732 A1 | 8/1992 |
|----|--------------|--------|
| EP | 1 376 024 A1 | 1/2004 |
| JP | 48-37558     | 5/1973 |
| JP | 52-97346     | 7/1977 |
| JP | 57-131820 A  | 8/1982 |
| JP | 57-150227    | 9/1982 |
| JP | 57-195022 A  | 11/1982 |
| JP | 60-023622 A  | 2/1985 |
| JP | 62-145019    | 9/1987 |
| JP | 11 014093 A  | 1/1999 |
| JP | 11-276827    | 10/1999 |
| JP | 11 276827 A  | 10/1999 |
| JP | 2001 170430 A | 6/2001 |
| JP | 2001-170430 A | 6/2001 |
| JP | 2004-245440  | 9/2004 |
| JP | 2004 245448 A | 9/2004 |

(Continued)

*Primary Examiner* — Gregory A. Wilson
*Assistant Examiner* — Seth Greenia
(74) *Attorney, Agent, or Firm* — Venable LLP; Michael A. Sartori; Steven J. Schwarz

(57) ABSTRACT

In an air conditioner having a main body provided with a panel 1 including a front panel 1a and a top panel 1b, the main body incorporating an air passage connecting an air inlet 2 and an air outlet 3, an air filter 4, a heat exchanger 5, a blower fan 6, and a dedusting device 7 attached to the front face of the air filter 4 which is reciprocated along the surface of the air filter 4, the top panel 1b is opened/closed as the dedusting device 7 is reciprocated.

8 Claims, 32 Drawing Sheets

FOREIGN PATENT DOCUMENTS

| | | |
|---|---|---|
| JP | 2005 024135 A | 1/2005 |
| JP | 2005-180814 | 7/2005 |
| JP | 2005 188808 A | 7/2005 |
| WO | WO 2004/079271 A1 | 9/2004 |
| WO | WO2004079271 * | 9/2004 |
| WO | WO 2006/046404 A1 | 5/2006 |
| WO | WO 2006/049043 A1 | 5/2006 |

* cited by examiner

AIR CONDITIONER AND METHOD FOR ASSEMBLING THE SAME

BACKGROUND OF THE INVENTION

1. Technical Field

This invention relates to an indoor unit of an air conditioner, and more specifically to an air conditioner having a cleaning function of automatically removing dust deposited to a filter attached for dedusting.

Further, this invention relates to an air conditioner provided with a dedusting device which is reciprocated along the surface of an air filter, and more particularly to an air conditioner capable of miniaturizing its body by reducing the space for operating the dedusting device.

Further, this invention relates to an air conditioner, and more specifically to the structure of an air conditioner provided with a filter take-off preventing unit for exactly holding an air filter so that the air filter attached for dedusting is not taken off from a filter rail.

2. Related Art

The air conditioner (indoor unit) is provided with a filter for dedusting for preventing dust from flowing into the unit from an air inlet. The dust is accumulated in the filter with passage of time. So, a user must remove the filter from the unit at an appropriate time and clean it.

Usually, since the air conditioner is installed at a high position of a room, the operation of attaching or detaching the filter is troublesome. In addition, the operation of diligently removing dust deposited on the filter is also troublesome. Therefore, the operation for cleaning the filer is apt to be given a wide berth.

However, if the filter is left with dust accumulated, the air flow-rate will be reduced so that the efficiency of thermal conversion is lowered. In addition, the dust may get mildewed so that a bad smell or house dust which gives rises to allelgic symptoms is attracted. So, recently, there have been proposed some air conditioners having a cleaning function of automatically removing dust deposited on the filter.

An example thereof is disclosed in Patent Reference 1. This air conditioner has a cleaning device for scraping dust deposited on the filter by moving a bar-like cleaning brush from the one end to the other end of the filter while being kept in contact with the filter.

In accordance with such a configuration, since the filter with dust deposited can be automatically cleaned periodically, the user can made free to a certain degree from the troublesome detaching operation and cleaning operation.

However, the above conventional air conditioner has the following problems. The first problem is as follows. The cleaning device in Patent Reference 1 removes the dust on the surface of the filter by moving the cleaning brush along the surface of the filter. However, since the filter is usually made of relatively flexible resin, if its surface is pressed by the cleaning brush, the filter will warp owing to the pressing force of the brush so that the brush cannot be held down on the surface of the filter by uniform force. Thus, the dust cannot be surely scraped off.

The second problem is as follows. In the cleaning device disclosed in Patent Reference 1, the cleaning brush is provided on only the surface of the filter. Owing to this, if the cleaning operation is carried out while the blower fan is driven, the dust scraped by the cleaning brush may be conveyed to the side of a heat exchanger through the filter. Therefore, to carry out the cleaning operation while the air conditioner is driven is not preferable.

Further, in a conventional air cleaner or air conditioner, where it is installed at a high position, when a dust-collecting filter is detached for its cleaning, dust fell on a user's face or body or hand became dirty and so insanitary. So, some conventional air cleaners or air conditioners are provided with a filter dedusting device capable of cleaning the filter without being detached and keeping it in a clean state by installing a brush operating on the front surface of the filter (see, for example Patent Reference 1).

However, the above filter dedusting device is configured to operate in a space between the air inlet of the air cleaner or air conditioner and the above filter. This presents a problem that its size in the vertical or horizontal direction is increased, thereby making it difficult to reduce the size.

Further, in a conventional air conditioner in which air within a room is taken into an air conditioner body from the front surface and upper surface thereof as a blower fan is driven, dust is removed by an air filter provided along filter guides (guide frames) within the air conditioner body, and the air with dust removed is heat-exchanged by a heat exchanger and discharged into the room from an air outlet formed on the lower surface of the air conditioner body, an air filter device has a structure provided with a friction preventing projection is formed on either the filter guide (guide frame) or the air filer, which permits simple pushing operation and gives less vibration noise.

Further, the upper end of the air filter pushed in is depressed by a depressing projection formed inside the upper face of the front cabinet so that the air filter does not hit on a grid frame with an air inlet formed on the top panel of a rear cabinet. In addition, a projection is formed at the upper end of the air filter so that the upper end of the air filter can be smoothly inserted when it is pushed into the innermost part of the air conditioner (see Patent Reference 2).

However, for example, where each the filter guides (guide frames) is fixed at its both ends and not fixed at its intermediate position, when the air filter is inserted, the air filter forcibly opens the filter guide (guide frame) so that the interval between the filter guides (guide frames) is increased. As a result, the air filter may be taken off from the filter guides (guide frames) and so the poor mounting of the air filter by a user may occur.

[Patent Reference 1]
JP-A-2001-170430
[Patent Reference 2]
JP-A-11-276827

SUMMARY OF THE INVENTION

Thus, this invention is accomplished in order to solve the above problems. An object of this invention is to provide an air conditioner capable of surely removing dust deposited on a filter and storing the dust thus removed and also carrying out filter cleaning even while air conditioning is executed.

Further, another object of this invention is to provide a an air conditioner capable of miniaturizing its body by reducing the space for operating the dedusting device.

Further, still another object of this invention is to provide an air conditioner provided with a filter take-off preventing unit for exactly holding an air filter so that the air filter is not taken off from a filter rail.

In order to attain the above object, this invention have the following various features.

According to claim 1, there is provided an air conditioner including:

a body cabinet provided with an air inlet and an air outlet in which at least a blower fan is housed, and a filter for dedusting, a cleaning section for removing dust deposited on the filter and a moving unit for moving the cleaning section to the filter, which are incorporated in the body cabinet, wherein the cleaning section includes:

a cleaning member for removing the dust deposited on the filter, and a pressing member for pressing a back surface of the filter in correspondence with the cleaning member.

According to claim 2, there is provided the air conditioner according to claim 1, further including:

a main frame arranged so as to cover the blower fan, and a filter supporting unit for supporting the filter, a guide frame having a moving path for the cleaning section and a cleaning section moving unit for moving the cleaning section through the guide frame, which are incorporated in the main frame.

According to claim 3, there is provided the air conditioner according to claim 1 or 2, further including:

a control section for controlling the cleaning section and the cleaning section moving unit, wherein the control section drives the cleaning section regardless of the operating state of the blower fan.

According to claim 4, there is provided the air conditioner according to claim 2 or 3, wherein the guide frame is provided to extend from the upper end to the lower end of the body cabinet, and the cleaning section is moved reciprocally between the upper end and lower end of the guide frame.

According to claim 5, there is provided the air conditioner according to any one of claims 1 to 4, wherein the cleaning section moving unit includes a driving belt driven by a predetermined driving unit.

According to claim 6, there is provided the air conditioner according to claim 5, wherein the driving belt is taken up by two take-up reels at both ends thereof, and the cleaning section is moved reciprocally by reciprocally rotating the take-up reels.

According to claim 7, there is provided the air conditioner according to any one of claims 1 to 6, further including:

an upper, a front, a left-side and a right-side panel as separated members, respectively, wherein of the panels, at least the front panel is arranged over the main frame and the front sides of the left-side and right-side panels.

According to claim 8, there is provided the air conditioner according to any one of claims 1 to 7, further including:

a dust box for accumulating removed dust in the cleaning section.

According to claim 9, there is provided the air conditioner according to claim 8, further including:

a communicating window for removing dust accumulated within the dust box therein.

According to claim 10, there is provided an air conditioner including:

a body provided with a panel, an air filter and a blower fan incorporated in the body, and a dedusting device attached to the front face of the air filter, the dedusting device being reciprocated along the surface of the air filter, wherein the panel is opened/closed as the dedusting device is reciprocated.

According to claim 11, there is provided the air conditioner according to claim 10, wherein the panel is forcibly opened by the dedusting device.

According to claim 12, there is provided the air conditioner according to claim 10, wherein the panel is provided with a pivoting member for pivoting the panel.

According to claim 13, there is provided the air conditioner according to claim 10, wherein the panel is provided with a link mechanism for translating the panel.

According to claim 14, there is provided an air conditioner including: a body cabinet provided with an air inlet and an air outlet in which at least a blower fan is housed, a filter for dedusting, a cleaning section for removing dust deposited on the filter and a moving unit for moving the filter and the cleaning section relatively to each other, which are incorporated in the body cabinet, wherein the cleaning section includes: a cleaning brush for cleaning the filter, a dust box for accumulating dust and a dust recovery unit for recovering dust captured by the cleaning brush into the dust box.

According to claim 15, there is provided the air conditioner according to claim 14, further including:

a cleaning brush rotation restricting unit for bringing the cleaning brush into contact with the filter while the cleaning brush moves in one direction and separating the cleaning brush from the filter so as to be placed in a non-contact state while the cleaning brush moves in the other direction, the cleaning brush being supported rotatably around a predetermined rotary axis within the dust box.

According to claim 16, there is provided the air conditioner according to claim 14 or 15, wherein the dust recovery unit is placed on a rotating locus of the cleaning brush, and includes a dust recovery member which is kept in contact with the cleaning brush in the non-contact state when the cleaning brush is apart from the filter.

According to claim 17, there is provided the air conditioner according to claim 16, wherein the dust recovery member is normally spring-urged toward the cleaning brush.

According to claim 18, there is provided the air conditioner according to claim 16 or 17, wherein the dust recovery member includes an inclined brush which is in contact, at an acute angle, with a returning-rotation direction of the cleaning brush.

According to claim 19, there is provided the air conditioner according to any one of claims 15 to 18, wherein the cleaning brush is kept in the non-contact state separated from the filter by the dust recovery member while the cleaning brush moves in the other direction.

According to claim 20, there is provided the air conditioner according to any one of claims 15 to 19, wherein the cleaning brush partially includes a locking face, and the cleaning brush rotation restricting unit includes:

a locking portion for keeping the cleaning brush in contact with the filter by being brought into contact with the locking face while the cleaning brush moves in the one direction, a locking portion unlocking unit for unlocking the locking portion from the locking face at a terminating position while the cleaning brush moves in the one direction, and a locking portion locking unit for bringing the locking portion into the locking face at another terminating portion while the cleaning brush moves in the other direction.

According to claim 21, there is provided the air conditioner according to claim 20, wherein the locking portion is rotatable around a predetermined rotary shaft;

the cleaning brush and the locking portion include cams attached to rotary shafts thereof;

the locking portion unlocking unit is a first cam follower for rotating the cleaning brush and the locking portion through the cams in a predetermined direction respectively so that at the terminating position while the cleaning brush moves in the one direction, the locking portion first rotates to be unlocked from the locking face, and the cleaning brush rotates to be separated from the filter.

According to claim 22, there is provided the air conditioner according to claim 20 or 21, wherein the locking portion locking unit is a second cam follower for rotating the cleaning brush through the cam attached to the rotary shaft of the cleaning brush in another predetermined direction so that at the terminating position while the cleaning brush moves in the other direction, the cleaning brush is restored to a state in contact with the filer, and the locking portion is brought into contact with the locking face.

According to claim 23, there is provided the air conditioner according to any one of claims 20 to 22, wherein the body cabinet includes: a filter supporting unit for supporting the filter and a guide frame having a moving path for the cleaning section;

one of the locking portion unlocking unit and the locking portion locking unit is arranged on the side of the filter; and the other thereof is arranged on the side of the moving path for the cleaning section of the guide frame.

According to claim 24, there is provided the air conditioner according to any one of claims 20 to 23, wherein each of the first cam follower constituting the locking portion unlocking unit and the second cam follower constituting the locking portion locking unit is a convex stand formed high by one step so that each the cams climbs.

According to claim 25, there is provided an air conditioner including:

a body cabinet provided with an air inlet and an air outlet in which at least a blower fan is housed, an air filter detachably supported by filter rails, which are incorporated in the body cabinet, and a filer take-off preventing unit so that the air filter is not taken off upon being mounted.

According to claim 26, there is provided the air conditioner according to claim 25, wherein each of the filter rails is supported at both ends thereof by the body cabinet.

According to claim 27, there is provided the air conditioner according to claim 25 or 26, wherein the filter take-off preventing unit includes:

a rail rib continuously formed on each of the filter rails, and a filter rib formed on the air filter in correspondence with the rail rib.

According to claim 28, there is provided the air conditioner according to claim 25 or 26, wherein the filter take-off preventing unit is a cabinet rib projected from the body cabinet so as to correspond to the filter rails and abutting on the filter rails.

In accordance with the invention described in claim 1, since the back surface of the filter is pressed by a filter receiving plate, the cleaning member can be surely brought into contact with the filter, and the dust scraped by the cleaning member can be prevented from passing through filter toward a heat exchanger.

In accordance with the invention described in claim 2, since the cleaning section is moved through the guide frame, it can be moved smoothly and with small torque, thereby reducing component cost. In addition, the rigidity of the body cabinet can be increased, thereby improving the capability of assembling.

In accordance with the invention described in claim 3, since the back surface of the filer is pressed by the filter receiving plate, the dust does not pass through the filter toward the heat exchanger. For this reason, the filer cleaning can be carried out even while the air conditioner is in operation.

In accordance with the invention described in claim 4, since the cleaning section is moved vertically between the upper end (upper air inlet) and lower end (front air inlet) of the body cabinet, the shape of the cleaning section can be simplified as compared with the case where the cleaning section is moved horizontally. In addition, the area which can be cleaned at a time can be increased, thereby shortening the driving time.

In accordance with the invention described in claim 5, since the cleaning section moving unit is constructed in a driving belt system, it can be miniaturized as compared with e.g. a gear driving system. In addition, since the driving belt is difficult to conblower vibration, operation noise can be suppressed.

In accordance with the invention described in claim 6, since the driving belt is driven by taking up its both ends on the reels, unlike e.g. a sprocket system, the area to be processed of the driving belt may be small so that reblowerion in the strength of the belt can be prevented.

In accordance with the invention described in claim 7, the main frame can be served as a part of the panel of the body cabinet and the respective panels can be constructed divisionally. For this reason, cost for the mold can be reduced as compared with that for a conventional integral type panel.

In accordance with the invention described in claim 8, since the dust box for accumulating removed dust is provided so that the removed dust can be stored safely.

In accordance with the invention described in claim 9, without dismantling the dust box, the dust trapped in the dust box can be safely and cleanly through the communicating window.

Further, in accordance with this invention, since the panel is opened/closed as the dedusting device is reciprocated, there is provided an air conditioner capable of miniaturizing its body by reducing the space for operating the dedusting device.

Further, in accordance with the invention described in claim 14, the dust removed by the cleaning brush can be surely recovered into the dust box. So, it is possible to prevent the inside of the body cabinet from being contaminated owing to the dust scattered to the outside.

In accordance with the invention descried in claim 15, the cleaning brush is constructed in a rotating type so that it is kept in contact with the filter while it moves in the one direction whereas it is kept in non-contact therewith. So, the dust deposited on the filter can be effectively removed. Thus, it is possible to the dust removed from being deposited on the filter again.

In accordance with the invention described in claim 16, since the dust deposited on the cleaning brush whenever the cleaning section makes one round trip is recovered by the dust recovery brush, the filter can be always cleaned by a clean cleaning brush. In addition, the cleaning capability of the cleaning brush is not lowered so that the cleaning brush can be miniaturized.

In accordance with the invention described in claim 17, since the dust recovery member is normally spring-urged toward the cleaning brush, the dust recovery brush can be normally pressed on the cleaning brush by constant force. Thus, the dust can be recovered more surely.

In accordance with the invention described in claim 18, since the dust recovery brush is an inclined brush which is in contact, at an acute angle, with a returning-rotation direction of the cleaning brush. Therefore, when the cleaning brush is guided into the dust box, the dust scraped will not leak to the outside. When the cleaning brush returns to the outside again, the dust can be surely scraped by the dust recovery brush so that the dust can be surely trapped within the dust box.

In accordance with the invention described in claim 19, since a part of the cleaning brush is kept in the non-contact state by the dust recovery member, without providing any complicate mechanism, the cleaning brush can be held, thereby giving good assembling capability and probloweriv- ity.

In accordance with the inventions described in claims 20 to 23, since there is provided the cleaning brush rotation restrict- ing unit for restricting the rotation of the cleaning brush, when the cleaning brush moves in contact with the filter, it can be surely kept in contact with the filter, and when the cleaning brush moves to the terminating side, it can be forcibly rotated to be brought into non-contact therewith.

In accordance with the invention described in claim 24, since each cam follower is convex, as the cleaning section moves, the cleaning brush can be surely rotated by a simple structure so the problowerion cost can be reduced.

Further, in accordance with the invention, since there is provided a filter take-off preventing unit for preventing an air filter from taken off in mounting, even where each the filter guides is fixed at its both ends and not fixed at its intermediate position, when the air filter is inserted, the air filter does not forcibly open the filter guide so that the interval between the filter guides is not increased. As a result, the air filter may not be taken off from the filter guides. Accordingly, there is pro- vided the air conditioner capable of preventing the poor mounting of the air filter by a user.

BRIEF DESCRIPTION OF THE DRAWINGS

FIG. 17A is a view for explaining the procedure of filter cleaning and FIGS. 17B to 17D are a schematic view of movement of the brush during filter cleaning.

FIG. 19 is a view for explaining the second embodiment of this invention.

FIG. 22 is a view for explaining a third embodiment of an air conditioner according to this invention.

FIG. 25 is a view for explaining the main part of the third embodiment of the air conditioner according to this inven- tion.

DETAILED DESCRIPTION OF THE PREFERRED EMBODIMENTS

First Embodiment

Figure 1:
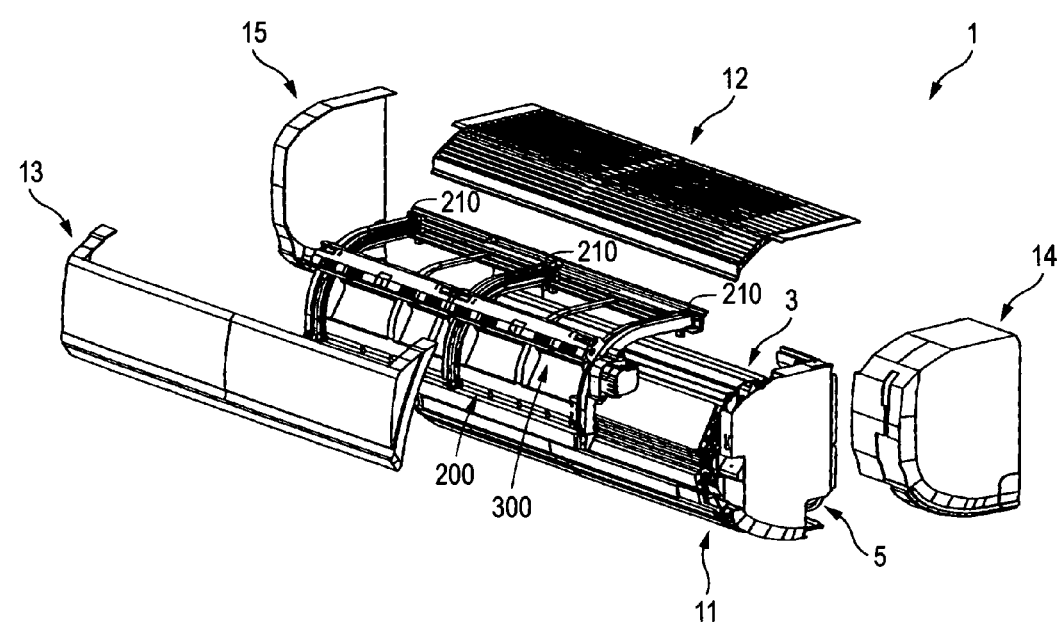
FIG. 1 is an exploded perspective view of an air conditioner according to a first embodiment of this invention.
Figure 2:
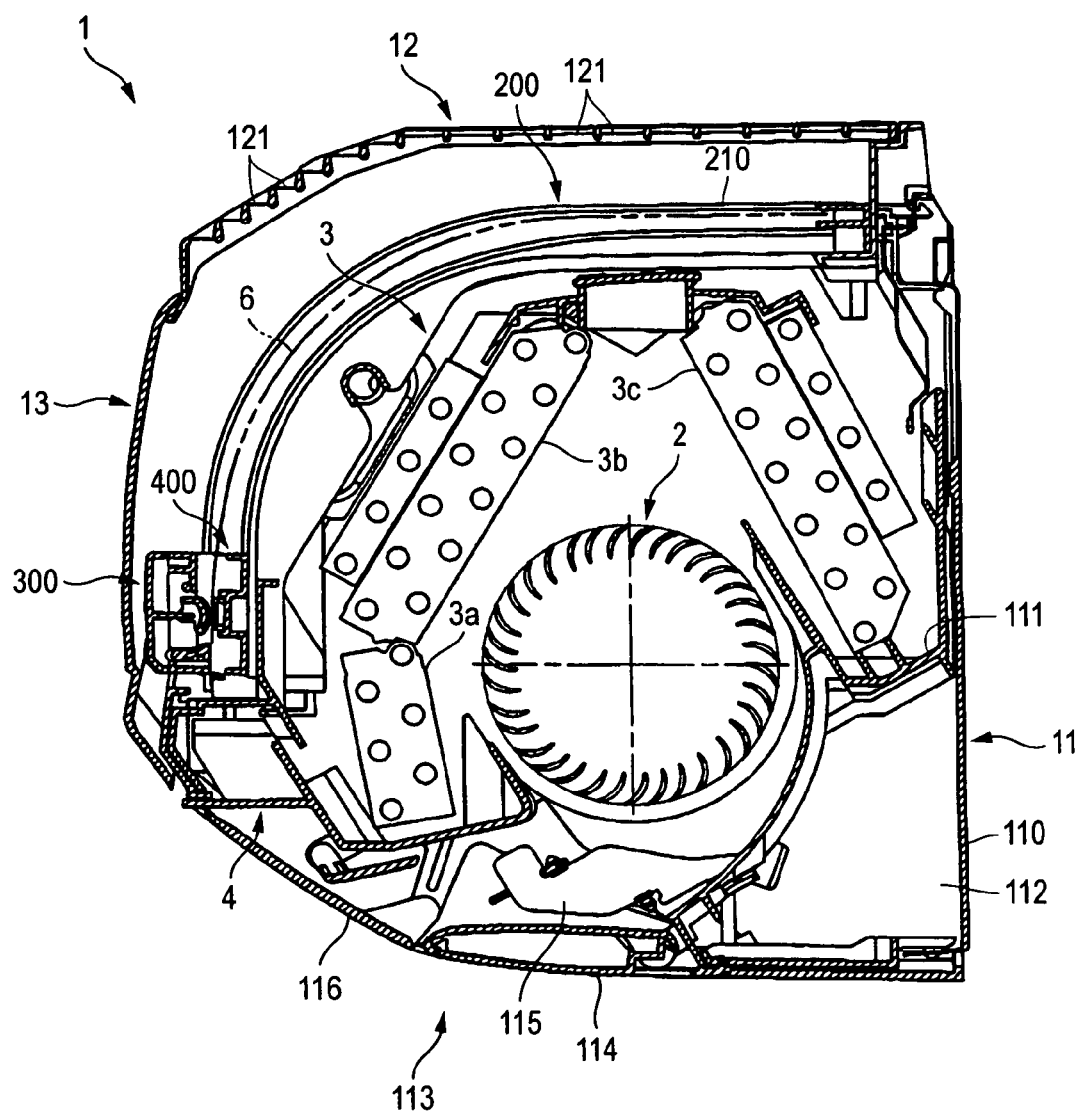
FIG. 2 is a schematic sectional view of the internal struc- ture of the above air conditioner.

Now referring to the drawings, an explanation will be given of an embodiment of this invention. FIG. 1 is an exploded perspective view of an air conditioner according to an embodiment of this invention. FIG. 2 is a longitudinal sec- tional view of the air conditioner.

As seen from FIGS. 1 and 2, a body cabinet 1 of this air conditioner includes a back plate 110 attached onto a wall through an attaching screw (not shown), a base 11, an upper panel 12, a front panel 13, a right side panel 14 and a left side panel 15. All these members are molded problowers of synthetic resin. The body cabinet incorporates a cross-flow fan 2 serving as a blower fan, a heat exchanger 3, a drain pan 4, etc.

The base 11 is attached to the back plate 110 by a pair of right and left side plates (not shown) formed to overhang toward the wall from both sides of the heat exchanger 3. Between the side plates, the cross-flow fan 2 and heat exchanger 3 are supported. In this embodiment, the heat exchanger 3 includes three heat exchanging units $3a$ to $3c$ which are combined in a nearly $\Lambda$-shape and is arranged to spread on the upper surface of the cross-flow fan 2.

A drain pan 111 is formed in the base 11. The drain pan 111 serves to receive condensed water created by the heat exchanging unit $3c$ on the back side. Further, at the lower port of the back wall of the base 11, a housing portion 112 is formed to house various pipes and electric wires.

The upper panel 12 is attached to the upper end of the base 11. The upper panel 12 is detachably attached to the base 11 through a securing lug (not shown) projected from the rear end thereof. The upper panel 12 is extended to the tip of the front panel 13 in an arc shape so that its tip side lies on the heat exchanger 3.

The upper panel 12 has air inlets 121 formed over the entire surface. Although not shown, the air inlets 121 have a grill molded in a frame shape. The frame may be detachable and its shape can selected optionally.

In this embodiment, inside the upper panel 12, a passage is previously formed for moving a dust box 300 described later. In addition, as seen from FIG. 3, an ascending/descending unit 122 may be provided to lift the upper panel 12 while the dust box 300 moves, thereby assuring the passage of the dust box 300. The ascending/descending unit 122 is preferably a pantograph type composed of e.g. two arm levers 123 combined in an X-shape.

The front panel 13 is attached to the lower end of the base 11. The upper end of the front panel 13 is secured to the lower end of the upper panel 12, whereas its rear end is detachably fixed to the base 11 through a securing lug (not shown).

A driving unit 5 is built in the right side plate of the base 11. The driving unit 5 has an electrical equipment box (not shown) which incorporates a control unit, a power source unit, etc. for this air conditioner. A right side panel 14 is attached to the right side plate so as to conceal the driving unit 5. Likewise, a left side panel 15 is attached to the left side plate of the base 11.

On the lower surface of the base 11, an air outlet 113 for issuing air from the cross-flow fan 2 is formed. The air outlet 113 is provided with a diffuser 114 for controlling the quantity and direction of air issuing, a right/left wind direction plate 115 and a upper/lower wind plate 116.

As seen from FIG. 2, between the air inlets 121 of the upper panel 12 and the heat exchanger 3, a main frame 200 is arranged for holding the filter 6 for removing the dust contained the air flowing toward the heat exchanger 3.

In this embodiment, as the filter 6, there are provided two filters of a first filter which overlays the right half of the heat exchanger 3 and a second filter which overlays the left half thereof. However, since the respective filters 6, 6 have the same structure, only one thereof will be explained and the other thereof will not be explained.

Figure 4:
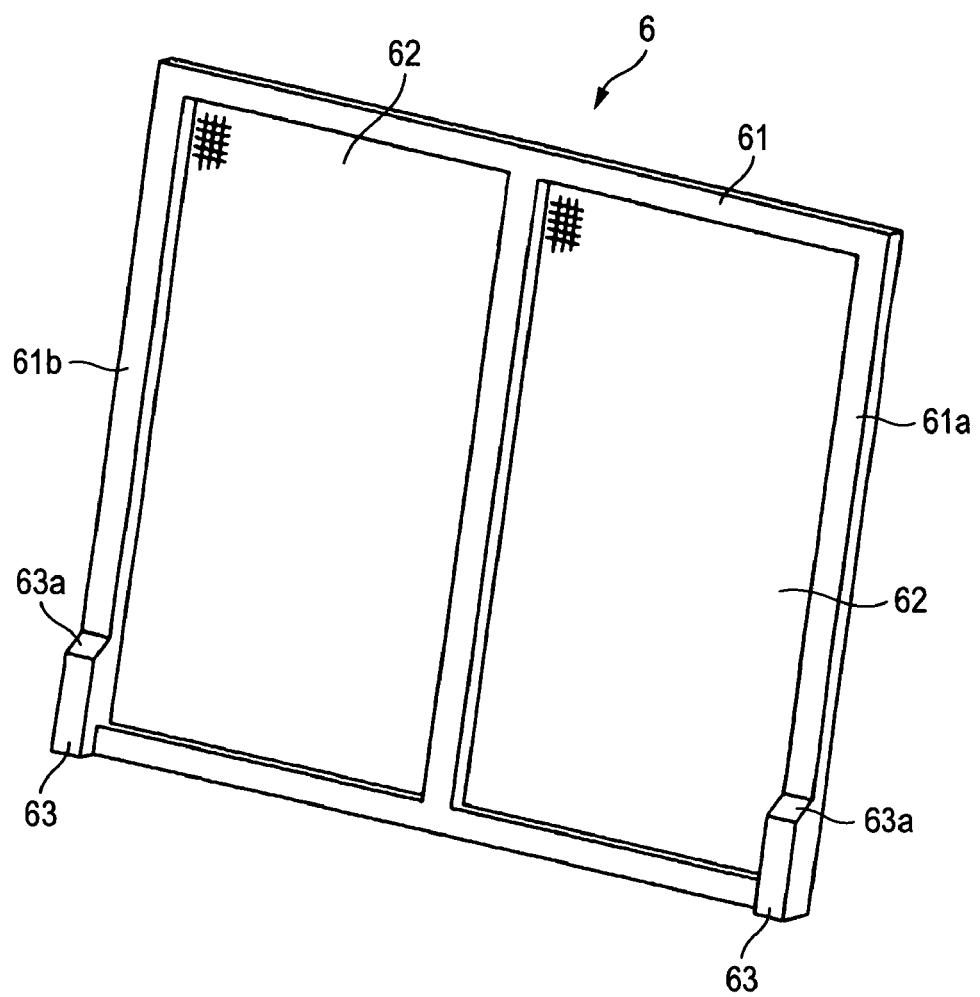
FIG. 4 is a perspective view of a filter.

As seen from FIG. 4, the filter 6 includes filter frames 61 formed in a frame shape having a predetermined width and filter segments 62 encircled by the filter frames 61 and having meshes formed regularly. The filter frames 61 and filter segments 62 can be integrally molded of synthetic resin, but may be molded as separate bodies to be combined.

The filter 6 is made of base resin such as polypropylene. The base resin is preferably doped with an anti-static agent such as conblowerive resin. Specifically, this intends to prevent adsorption of dust by electric charging because the filter 6 is likely to be electrically charged owing to its friction with a cleaning brush 330 made of nylon for a dust box 300 described later. Further, the base resin may be doped with a fungicide and antimicrobial agent.

Of the filter frames 61, filter frames 61a, 61b in parallel to the moving direction of the dust box 300 have first guide convexes 63, 63 serving as the one guiding unit for moving the brush of the dust box 300 to a predetermined position. Each the first guide convexes 63, 63 is a cam follower for rotating the cleaning brush 330 attached to the dust box 300 and has a slope 63a for rotating a cam described later.

Figure 5:
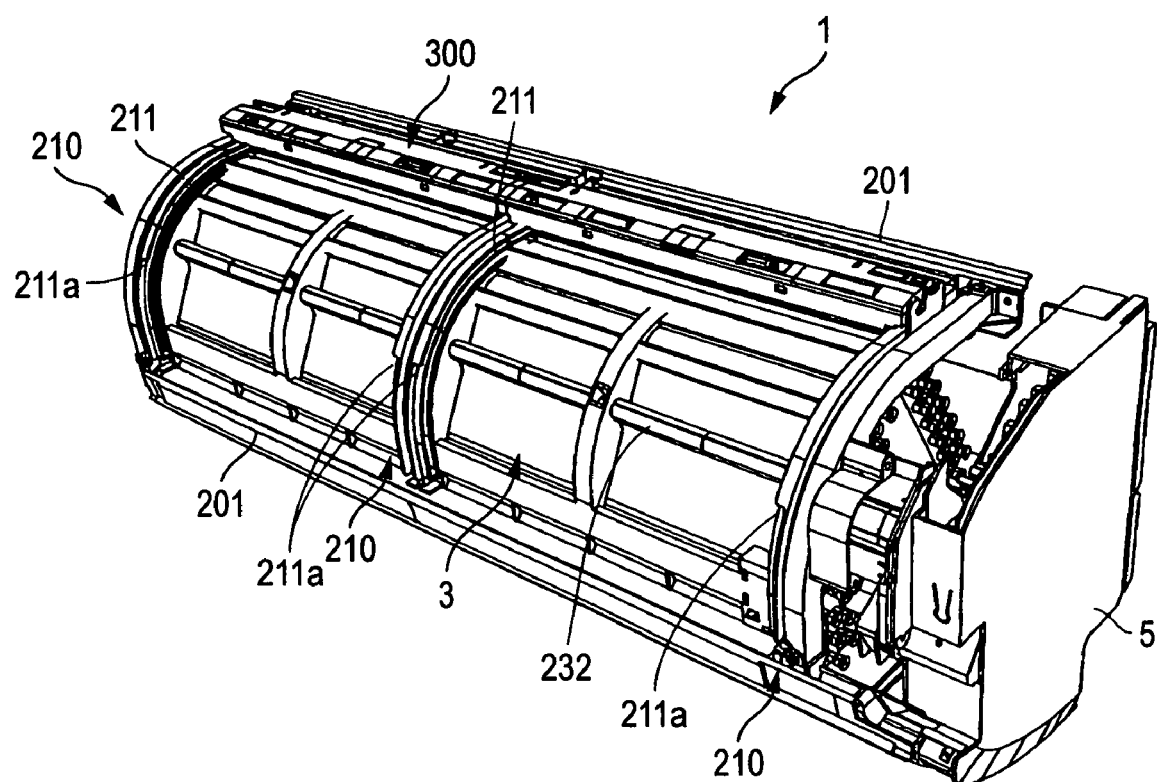
FIG. 5 is a perspective view of the air conditioner in a state where a front panel and an upper panel are taken off.
Figure 6:
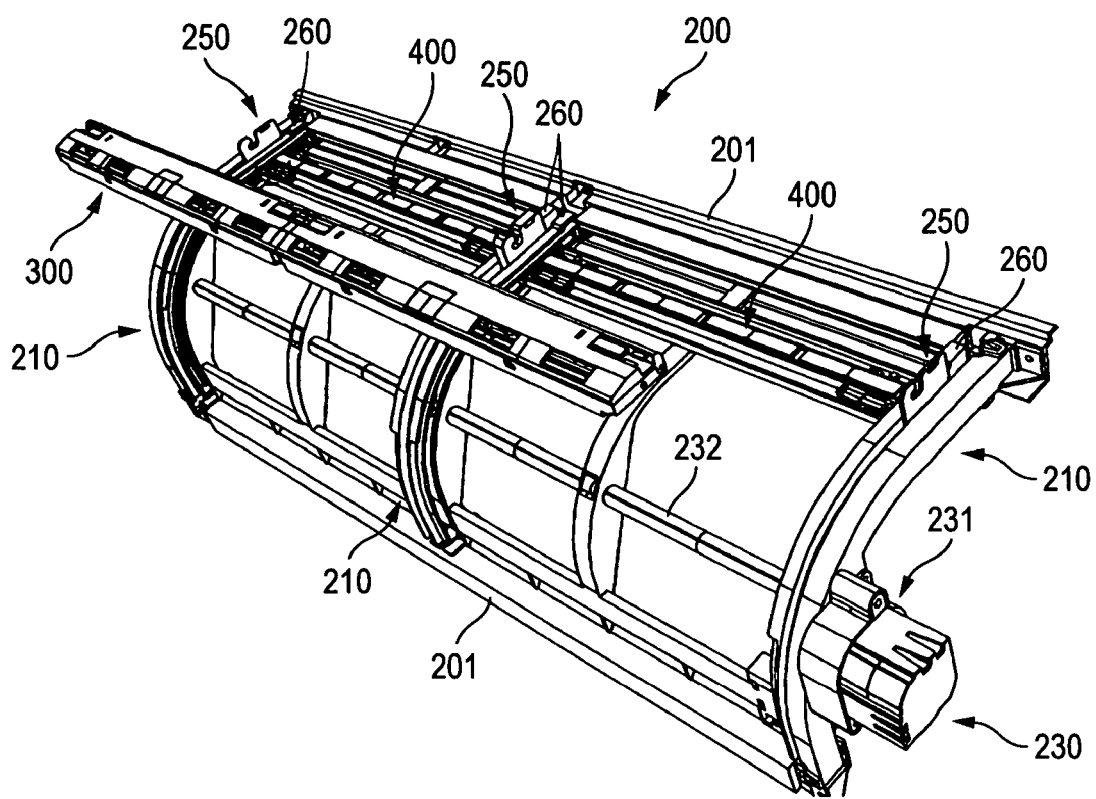
FIG. 6 is an exploded perspective view of a main frame and a dust box.

Referring to FIGS. 5 and 6, the main frame 200 has guide frames 210 each formed in an arc shape along the surface of the heat exchanger 3. The upper ends and lower ends of the guide frames 210 are coupled with one another by horizontal beam members 201, respectively.

Figure 7:
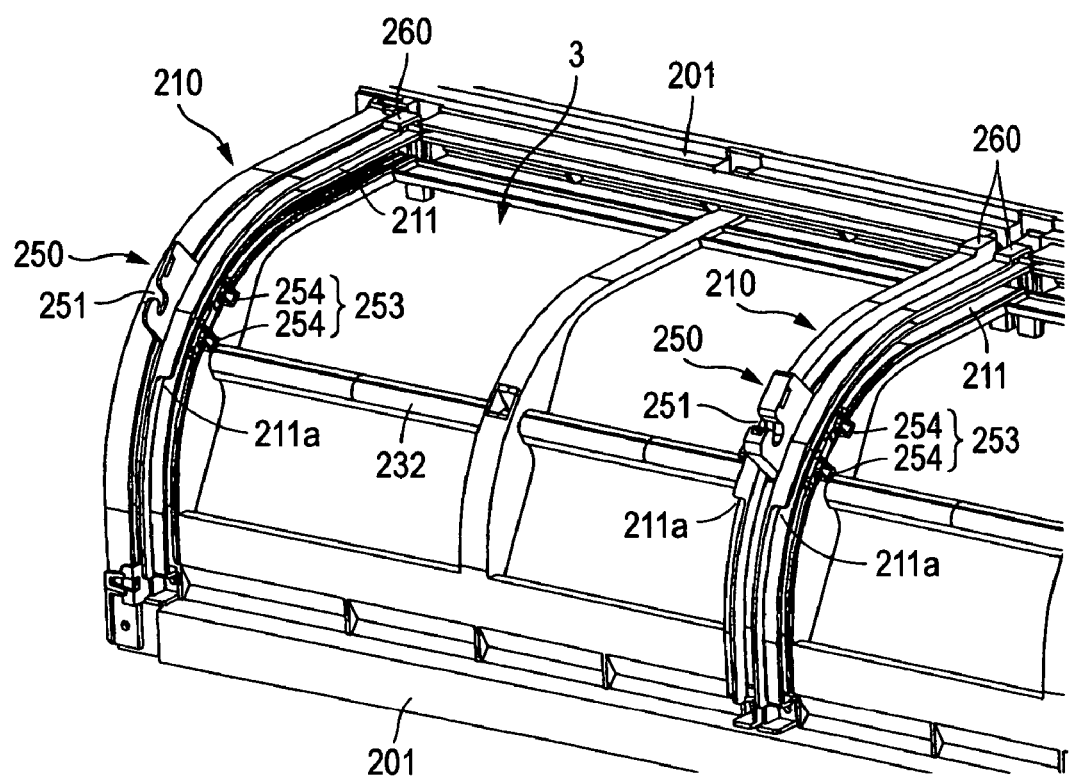
FIG. 7 is an enlarged perspective view of a part of the main frame.

As seen from an enlarged view of FIG. 7, each guide frame 210 has filter supporting grooves 211 for detachably supporting the filter 6. The filter supporting groove 211 is formed on the side of each guide frame 210. The filter supporting groove 211 has an inserting mouth 211a for inserting the filter 6 at the one end thereof.

Figure 8:
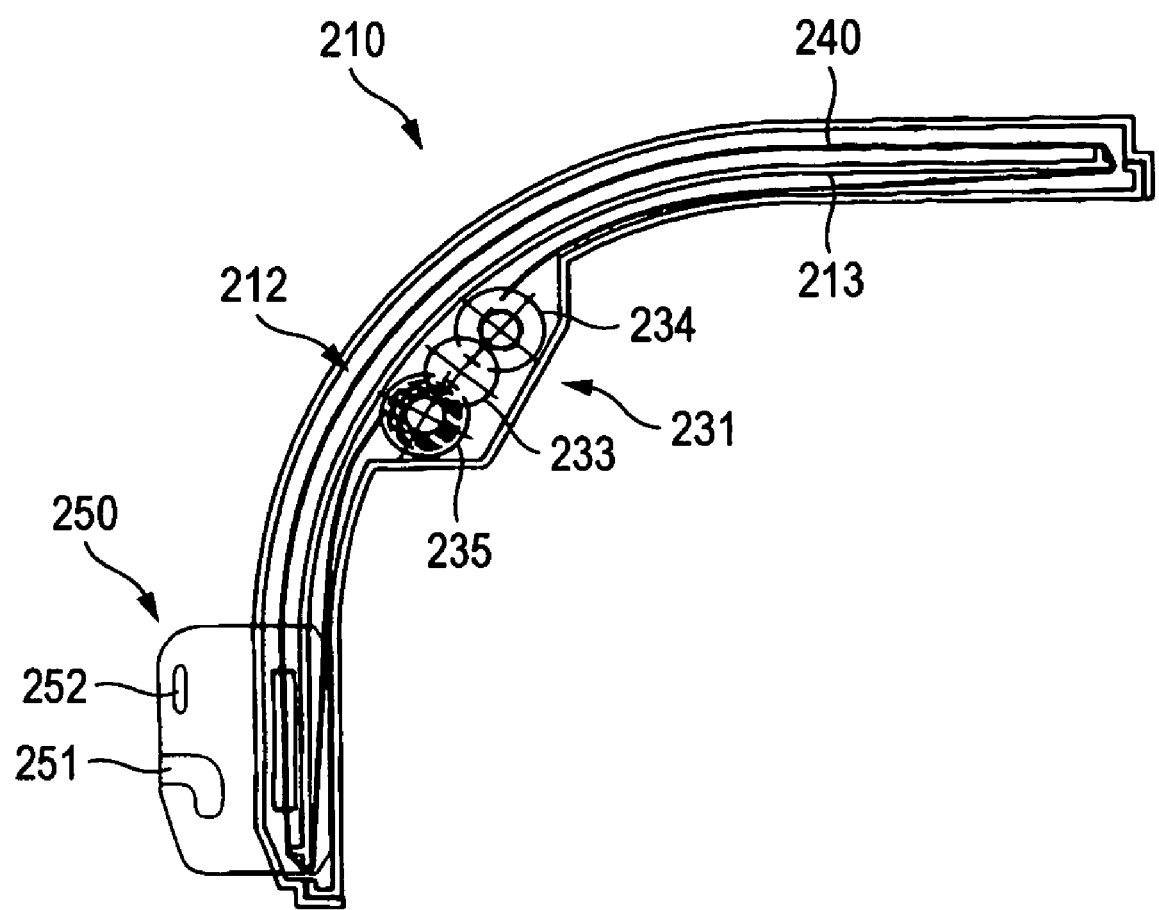
FIG. 8 is a schematic perspective view of the internal structure of a guide frame.

FIG. 8 is a schematic sectional view of the internal structure of the guide frame 210. The guide frame 210 incorporates a moving unit for driving the dust box 300 described later.

The moving unit includes a driving motor 230 which is controlled by a driving unit (not shown), a driving belt 240 for transmitting the rotational driving force of the driving motor 230 to the dust box 300 and a box mounter 250 connected to the driving belt 240 to mount the dust box 300. In this embodiment, the driving belt 240 is provided on each of both two sides of three guide frames 210. The central guide frame 210 is provided with only the box mounter 250 which moves freely along a moving passage 212 described later.

The driving motor (geared motor) 230 is given for only one of three guide frames 210 (on the right side in FIG. 6 within this embodiment) and housed in a dedicated gear case 231. The driving motor 230 is connected to the gear case 231 of each guide frame 210 through a driving shaft (not shown) protected by a shaft case 232.

The gear case 231 houses two take-up reels 234, 235 connected to the driving gear 233 of the driving motor 230. In this embodiment, the take-up reels 234, 235 rotate in the same direction through a predetermined intermediate gear.

As seen from FIG. 8, within the guide frame 210, a moving passage 212 for the driving belt 240 is provided separately from the filter supporting groove 211. The interior of the moving passage 212 is formed in an loop shape so as to sandwich a portioning wall 213. The driving belt 240 is arranged in the moving passage 212.

The ends of the driving belt 240 are fixed by the take-up reels 234, 235, respectively. By rotating the take-up reels 234, 235, for example, the driving belt 240 is taken up from the one take-up reel 234 to the other take-up reel 235.

In this embodiment, in view of inexpressiveness and quietness of the driving belt 240 and its maintenance, a belt driving system in which both ends thereof are fixed by the two take-up reels 234, 235 is adopted. However, for example, a chain driving system or rack-and-pinion driving system may be adopted. The driving system can be selected according to any required specification.

In accordance with such a configuration, since the main frame 200 constitutes a part of the panels of the body cabinet 1, as compared with a conventional integral type panel, the respective panel members can be molded individually. Thus, the mold to be used can be miniaturized and so its problowerion cost is reduced.

Figure 9:
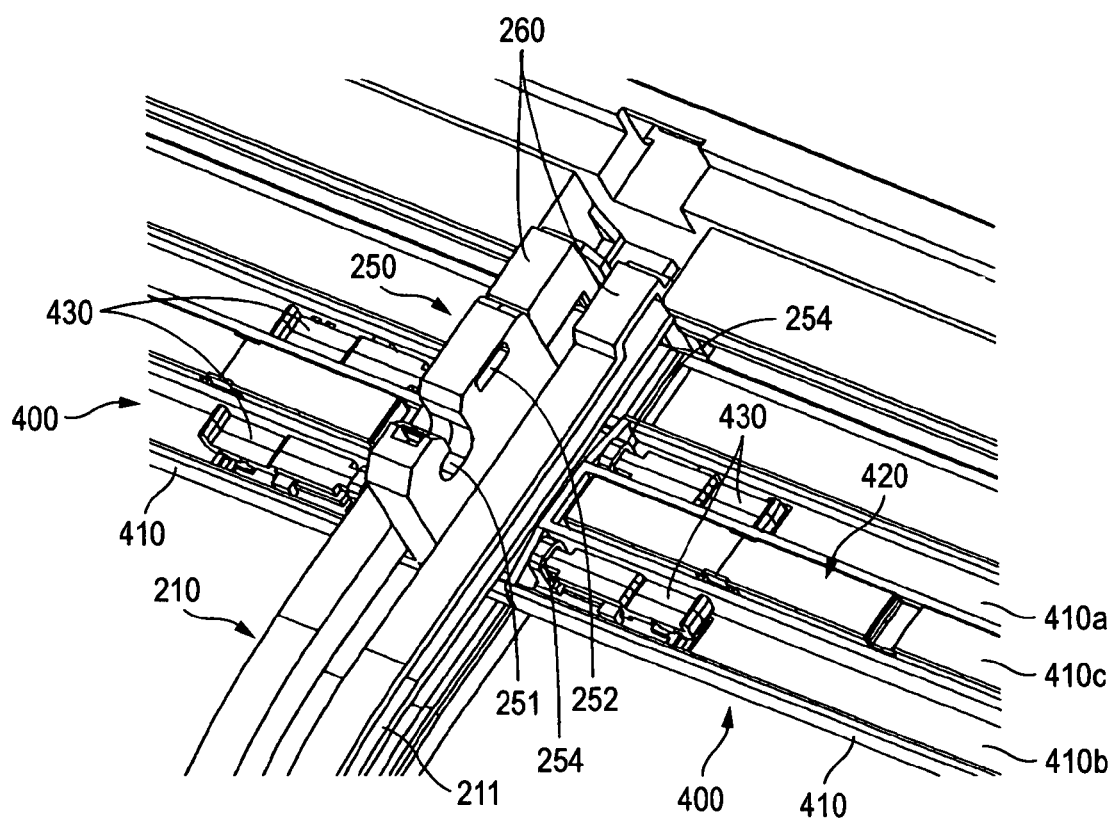
FIG. 9 is a perspective view of the manner of attaching a box mounter and a filter receiving plate.
Figure 10:
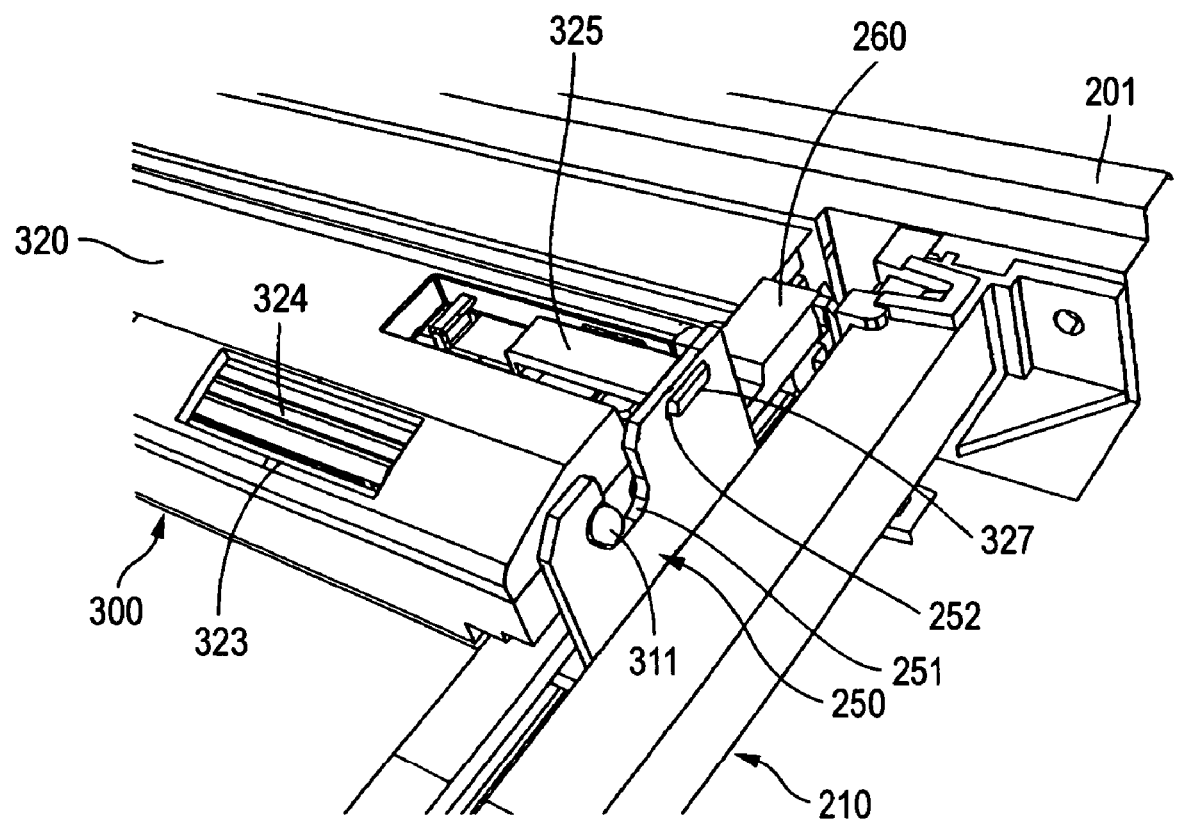
FIG. 10 is a perspective view of the manner of attaching the box mounter and the dust box.

Referring to both FIGS. 9 and 10, the box mounter 250 is formed of a flat plate-like body. The base side thereof is integrally fixed to the driving belt 240. The box mounter 250 is given for each guide frame 210. However, particularly, the box mounter 250 (FIG. 9) attached to the central guide frame 210, which intends to support two dust boxes 300 by oneself, is formed to have a plate thickness larger than those of the other box mounters 250.

At the upper end of the box mounter 250 (on the side opposite to the heat exchanger 3), a guide groove 251 is formed by which bosses 311 formed at both ends of the dust box 300 are guided. The guide groove 251 is a recess groove which is recessed internally from the upper end. In order to prevent the bosses 311 guided there from coming off, the recess groove is formed in an inverted L-shape.

In the box mounter 250, formed is a securing hole 252 into which locking lugs 327, 327 of the locking unit attached to the dust box 300 are inserted. The securing hole 252 is a through-hole formed on the sides of the box mounter 250. When the locking lugs 327, 327 are inserted into the through-hole, the dust box 300 is fixed.

Referring to FIG. 7 also, at the base side of the box mounter 250 (on the side of the heat exchanger 3), a securing portion 253 to which a filter receiving plate 400 described later is secured is formed. The securing portion 253 includes securing holes 254, 254 into which two securing lugs 430, 430 formed on the sides of the filter receiving plate 400 are inserted. The filter receiving plate 400, which is attached to the securing holes 254, 254, can move synchronously with the dust box 300.

In this embodiment, the central box mounter 250 illustrated in FIG. 9, by which two right and left dust boxes 300 are supported, is provided with the securing portions 253 on the right and left sides thereof. The number and shape of the securing holes 254 can be optionally changed according the specification required.

As seen from FIGS. 9 and 10, at the upper end of each guide frame 210, a second guide convex 260 serving as the other guiding unit is formed. The second guide convex 260 as well as the first guide convex 63, 63 in the filter 6 previously described constitutes the guide face for guiding the movement of the dust box 300, which is employed to move the cleaning brush 330 housed therein in a predetermined direction.

Figure 11:
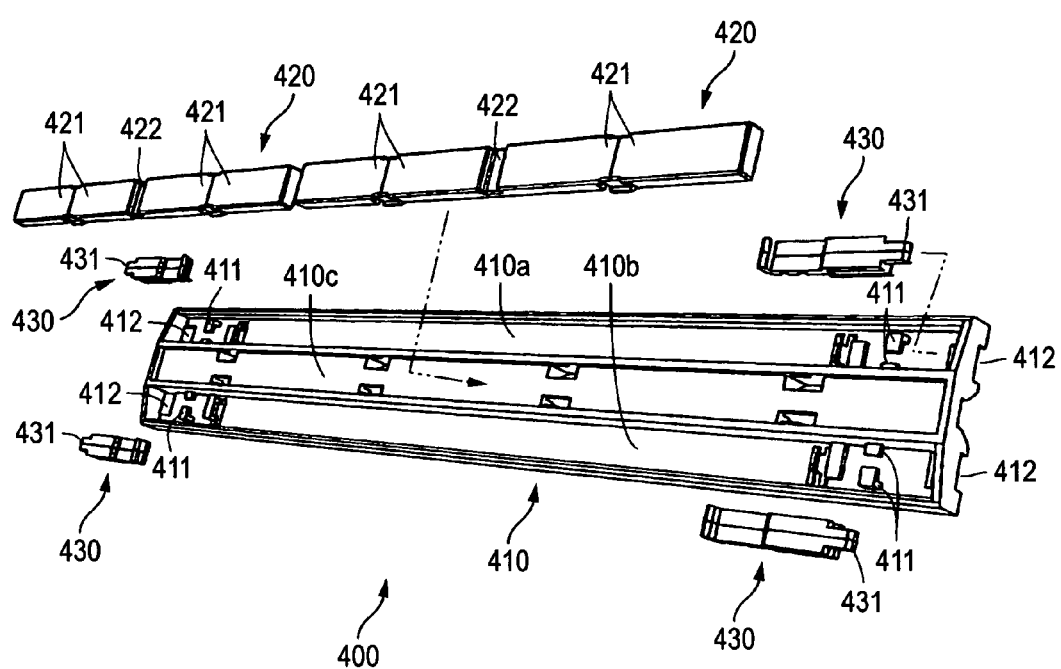
FIG. 11 is an exploded perspective view of the filter receiv- ing plate.

Next, referring to FIGS. 11 and 13, an explanation will be given of the structure of the filter receiving plate 400. In this embodiment, the filter receiving plate 400 is supported between the guide frames 210, 210 through the box mounters 250 and is placed for each filter at two positions. However, since both filter receiving plates have the same configuration, only the one will be explained and the other will be not be explained.

The filter receiving plate 400 is a square base plate 410 spanned between the guide frames 210, 210 and a receiving plate body 420 integrally attached to the base plate 410 so as to receive the back surface of the filter 6.

The base plate 410 is dented on its surface side, and partitioned into three housing sections 410a to 410c extending in the longitudinal direction. The central housing section 410c is provided with the receiving plate body 420. The housing sections 410a, 410b each is provided with securing lugs 430 for attaching the filter receiving plate 410 to the box mounter 250.

In this embodiment, the securing lugs 430 are provided at two points for each of the left and right sides, i.e. at total four points. At their tip, the securing lugs 430 each is provided with a securing convex 431 to be inserted into the securing hole 254. The base plate 410 has, on its both sides, openings 412 for deriving the tips 431 of the securing lugs 430 toward the sides of the base plate 410.

The receiving plate body 420 has receiving faces 421 in contact with the back surface of the filter 6. Between the respective receiving faces 421, a relief groove 422 for relieving the filter frame 61 is formed. As seen from FIG. 13, the receiving face 421 is arranged oppositely to the cleaning brush 330 attached to the dust box 300 and is a smooth face which receives the filter 6 pressed by the cleaning brush 330.

In this embodiment, although the receiving plate body 420 is arranged oppositely to the cleaning brush 330 across the filter 6, it may be arranged so as to depress the cleaning brush 330 on its upstream side and/or downstream side in the moving direction. As long as the receiving plate body 420 can absorb the pressing force of the cleaning brush 330, it may be arranged at any position. Further, also on the side of the filter receiving plate 420, the brush may be arranged to remove the dust deposited on the back surface of the filter 6.

Figure 12A:
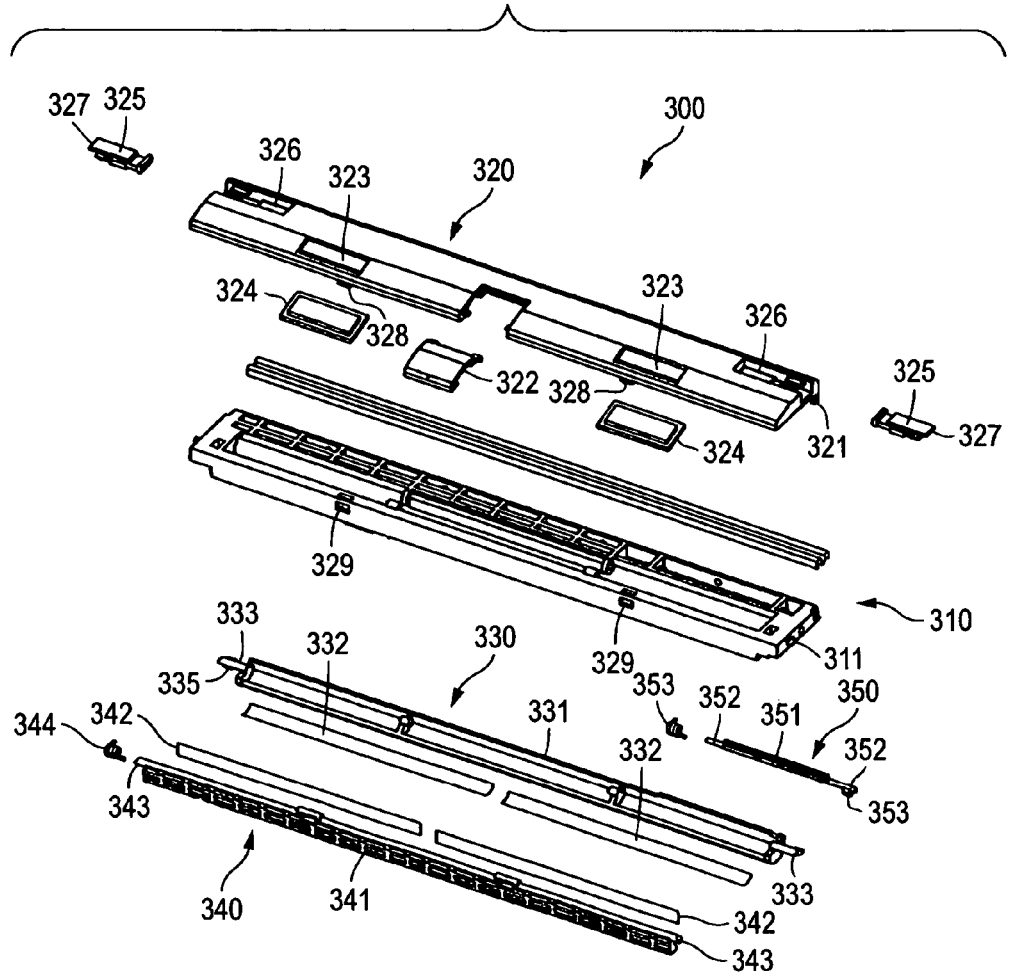
FIG. 12A is an exploded perspective view of the dust box and FIG. 12B is a reference perspective view of a locked state of a brush and a locking portion.

Next, referring to FIGS. 12A, 12B and FIG. 13, an explanation will be given of the structure of the dust box 300. The dust boxes 300 each is installed for each of two filters 6, 6 arranged between the guide frames 210, 210. Since both dust boxes 300 have the same structure, the explanation will be given of only the one dust box 300.

The dust box 300 includes a box body 310 opened on its both upper and lower surfaces, a top panel 320 for veiling the upper opening of the box body 310 and the cleaning brush 330 contactably arranged on the surface of the filter 6. The entire dust box 300 is formed in a square shape spanned between the guide frames 210, 210.

The box body 310 is formed of a cylindrical body whose upper and lower surfaces and both ends are opened. On the one inner wall thereof, a dust recovery brush 340 for scraping the dust deposited on the cleaning brush 330 is arranged. The dust recovery brush 340 has a brush stand 341 rotatably supported around a predetermined horizontal rotary shaft 343. A brush body 342 is formed integrally to the brush stand 341.

Figure 13:
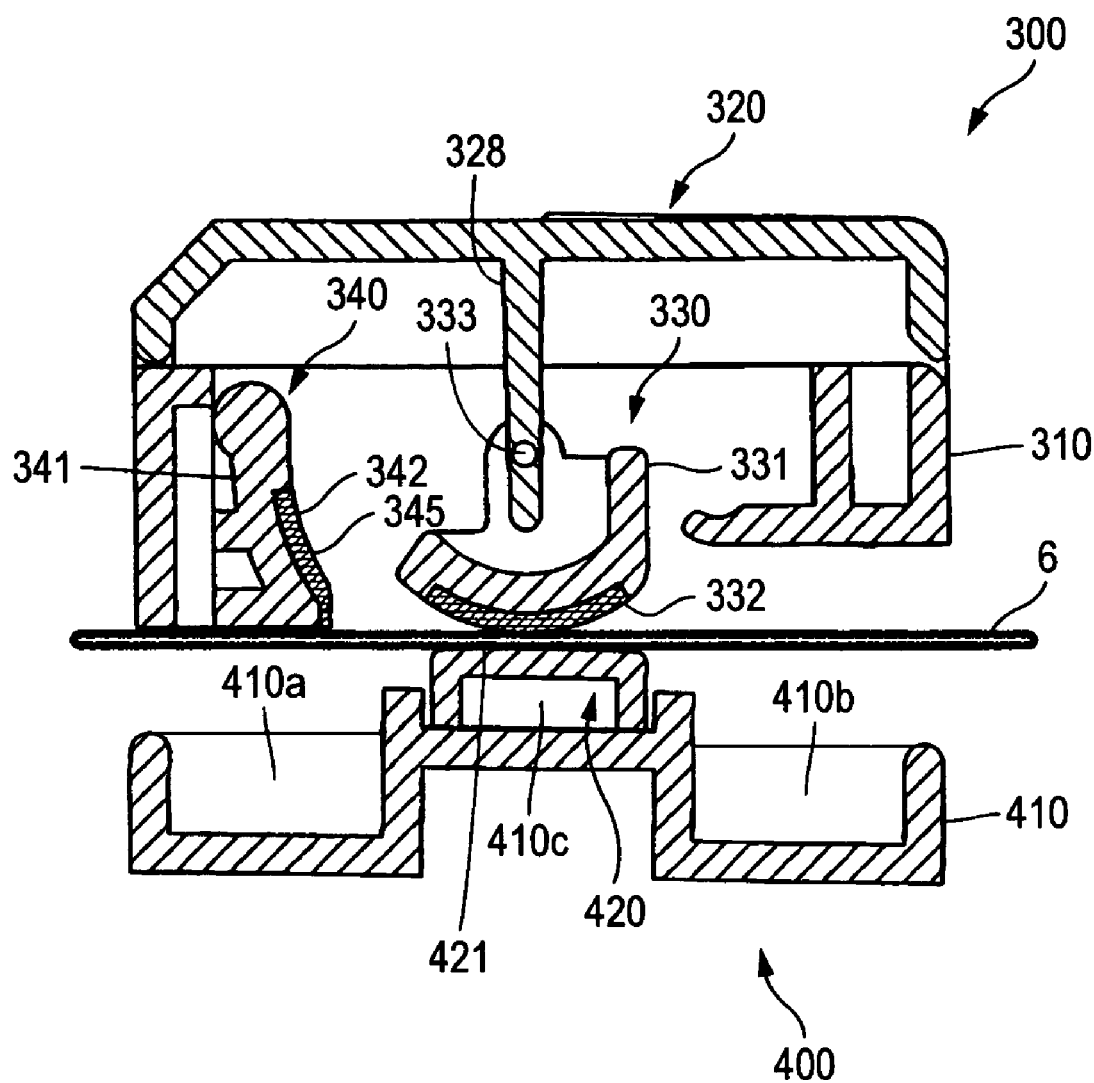
FIG. 13 is a schematic sectional view of the internal struc- ture of the dust box.

As seen from FIG. 13, the brush stand 341 is formed in a sectional trapezoidal shape. The brush stand 341 provides a brush face 345 in an arc shape along the rotating locus of the cleaning brush 330. The brush body 342 is formed of an inclined brush with brush hairs implanted aslant (not shown) and is installed right-aslant-upward in FIG. 13.

In this embodiment, a spring member 344 is attached to the horizontal rotary shaft 343 of the brush stand 341. So, the dust recovery brush 340 is normally spring-urged toward the cleaning brush 330 by uniform force.

In accordance with such a configuration, when the cleaning brush 330 rotates to approach the dust recovery brush 340, the dust recovery brush 340 is diagonally brought into contact with the cleaning brush 330. Thus, the dust deposited on the cleaning brush 330 can be surely recovered by the dust recovery brush 340. Further, since the brush stand 341 is spring-urged internally, when certain force is applied thereto, the dust recovery brush 340 gets away against spring force from the brush stand 341. In this way, the cleaning brush 330 can return smoothly to the original position.

Referring to FIG. 10, on the side in the longitudinal direction of the box body 310, a boss 311 is projected which is guided by the guide groove 251 formed in the box mounter 250. In this embodiment, the boss 311 is formed of a pillar-like convex.

The top panel 320 is formed in a square sectional ⊃-shape along the upper surface of the box body 310 and attached to the box body 310 so that it can be opened/closed around a horizontal rotary shaft 321 attached to the one end.

On the side of the free end of the top panel 320, hooks 329 for hooking the top panel 320 on the box body 310 are formed. At the one end of the plate, the hooks 329 each is provided with a hook lug 328 to be secured to the box body 310. In such a manner that the hook lugs 328 are secured to the box body 310, the opening/closing of the top panel 320 is restricted.

At the center of the top panel 320, a communicating window 322 which communicates into the box body 310 is formed. The communicating window 322 is an opening window for recovering the dust accumulated within the box body 310 without opening the top panel 320. By inserting a suctioning mouth of e.g. a cleaner through this window, the dust accumulated within the box body 310 can be easily recovered. Further, on the top panel 320, checking windows 323, 323 for checking the state of the dust within the box body 310 are also formed. Each the checking windows 323 are closed by a transparent cover 324.

The top panel 320 is provided with locking pieces 325, 325 on the right and left sides, for locking the dust box 300 to the box mounters 250. The locking pieces 325 are slidably attached to housing areas 326 formed by partially denting the top panel 320. As seen from FIG. 10, the securing lug 327 at their tip is inserted into the securing hole 252 of the box mounter 250.

Referring to FIG. 13 also, the cleaning brush 330 for scraping the dust deposited on the surface of the filter 6 is attached to the top panel 320. The cleaning brush 330 has a brush stand 331 which is rotatably pivoted on a predetermined horizontal rotary shaft 333. On the brush surface 334 of the brush stand 331, a brush body 332 is arranged.

The brush stand 331 is formed in a semi-cylindrical shape and rotatably pivoted on a horizontal rotary shaft 328 provided inside the top panel 320. The surface (brush surface 334) of brush stand 331 opposite to the filter 6 is formed in an arc shape. On the side surface in the longitudinal direction of the brush stand 331, formed is a locking face 336 locked by a locking portion 350 described later. The horizontal rotary shaft 333 of the brush stand 331 is provided with cams 335 for forcibly rotating the brush stand 331.

In this embodiment, the brush body 332 is a direct-hair brush in which brush hairs are implanted nearly vertically on a sheet-like substrate and integrally bonded on the brush surface 334 by e.g. adhesive.

Figure 12B:
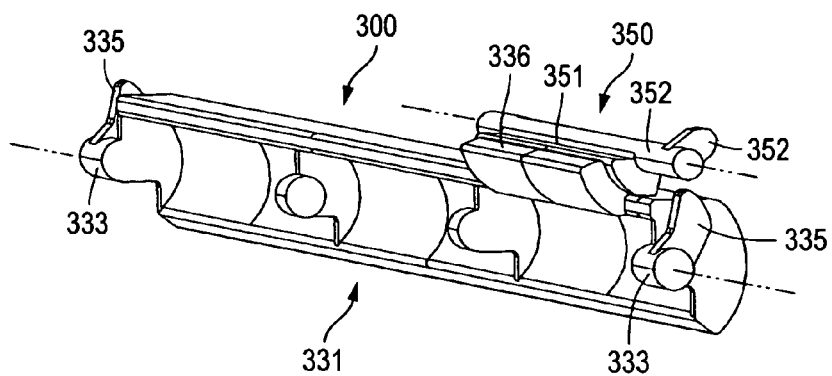

Referring to FIG. 12B, the cleaning brush 330 is provided with the locking portion 350 for restricting rotation of the cleaning brush 330 while the dust box 300 moves. The locking portion 350 is arranged adjacently to the side surface of the brush stand 331 and provided with a locking convex 351 secured along the locking face 336 of the brush stand 331.

The locking portion 350 is provided to be rotatably around the predetermined horizontal rotary shaft 352. The horizontal rotary shaft 352 is integrally provided with cams 353 for rotating the locking portion 350 to release the restriction of rotation therefor. The horizontal rotary shaft 352 is provided with springs for spring-urging the locking portion 350 consistently counterclockwise.

Next, an explanation will be given of the procedure of attaching the dust box 300 and the filter receiving plate 400. First, the filter receiving plate 400 is arranged between the guide frames 210. 210. Their securing lugs 430 are inserted into the securing holes 254. Next, the securing lugs 430 attached to the filter receiving plate 400 are slid so that their tips are inserted into the securing holes 254. Thus, the filter receiving plate 400 is integrally fixed to the box mounters 250.

Next, the filter 6 is attached to the guide frames 210, 210. The tip of the filter 6 is inserted into the guide frames from the inserting mouths 211a along the filter supporting grooves 211 until it is immovable. Thus, the filter 6 is spanned between the guide frames 210, 210 so that the front surface of the heat exchanger 3 is covered with the filter 6.

Next, the dust box 300 is attached. As seen from FIG. 6, using the dust box 300 previously assembled, the bosses 311 formed on both sides thereof are inserted along the guide grooves 251 of the box mounters 250 until it is provisionally fixed on the box mounters 250.

As seen from FIG. 10, the locking portion 325 attached to the top panel 320 is slid so that the securing lugs 327 are inserted into the securing holes 252 of the box mounters 250. Thus, the dust box 300 is fixed in a state where its both ends are put on the box mounters 250, 250.

Next, referring to FIGS. 14 to 17, an explanation will be given of an example of the procedure of filter cleaning. First, for example, when a user depresses a manual cleaning button formed on an operation panel such as a remote controller, the control unit (not shown) receives a command to effect the initialization of a cleaning step.

When the control unit receives the command for initialization, it determines whether or not the dust box 300 has moved to the lower end position. If the dust box 300 is not located at an initializing position, the driving motor 230 is driven so that the dust box 300 is moved to the lower end position through the driving belt 240. The lower end position can be detected using an object sensor, but may be also detected by detecting collision in the driving motor 230.

Upon completion of the initialization, the driving motor 230 is rotated backward. Thus, the dust box 300 and the filter receiving plate 400 start to move along the guide frames 210 through the driving belts 240.

Figure 14A:
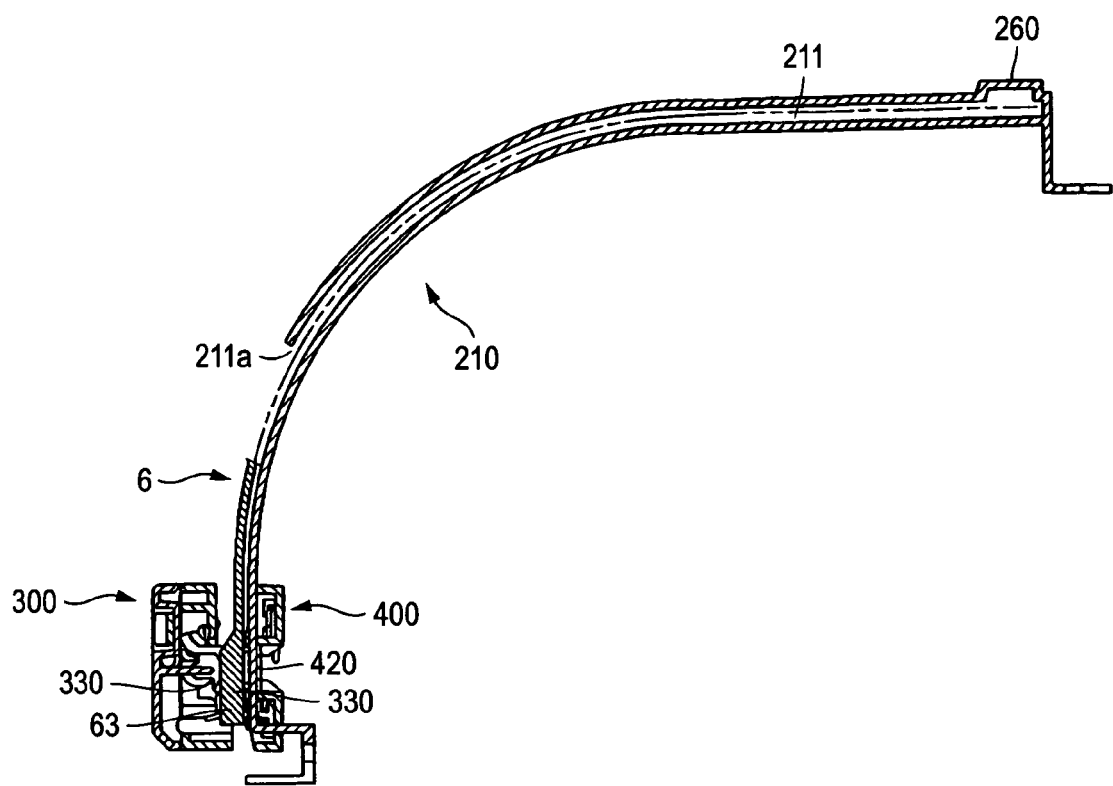
FIG. 14A is a view for explaining the procedure of filter cleaning and FIG. 14B is a schematic view of movement of the brush during filter cleaning.
Figure 14B:
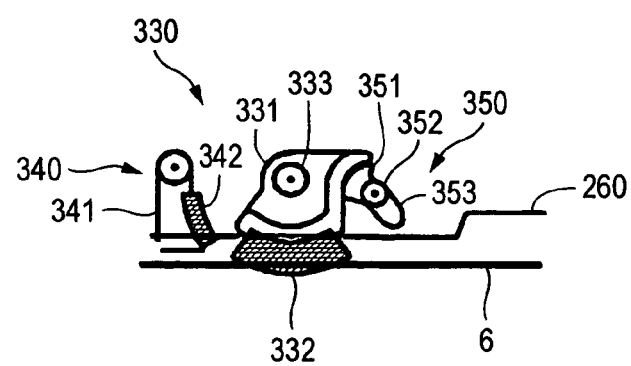

At this time, as seen from FIG. 14B, the cleaning brush 330 projected from the lower surface of the dust box 300 moves while being kept in contact with the surface of the filter 6, and scrapes the dust deposited on the filter 6. On the back surface of the filter 6, the filter receiving plate 400 is arranged oppositely to the cleaning brush 330. Thus, the filter 6 is pressed by the cleaning brush 330 and is prevented from being got away.

Figure 15A:
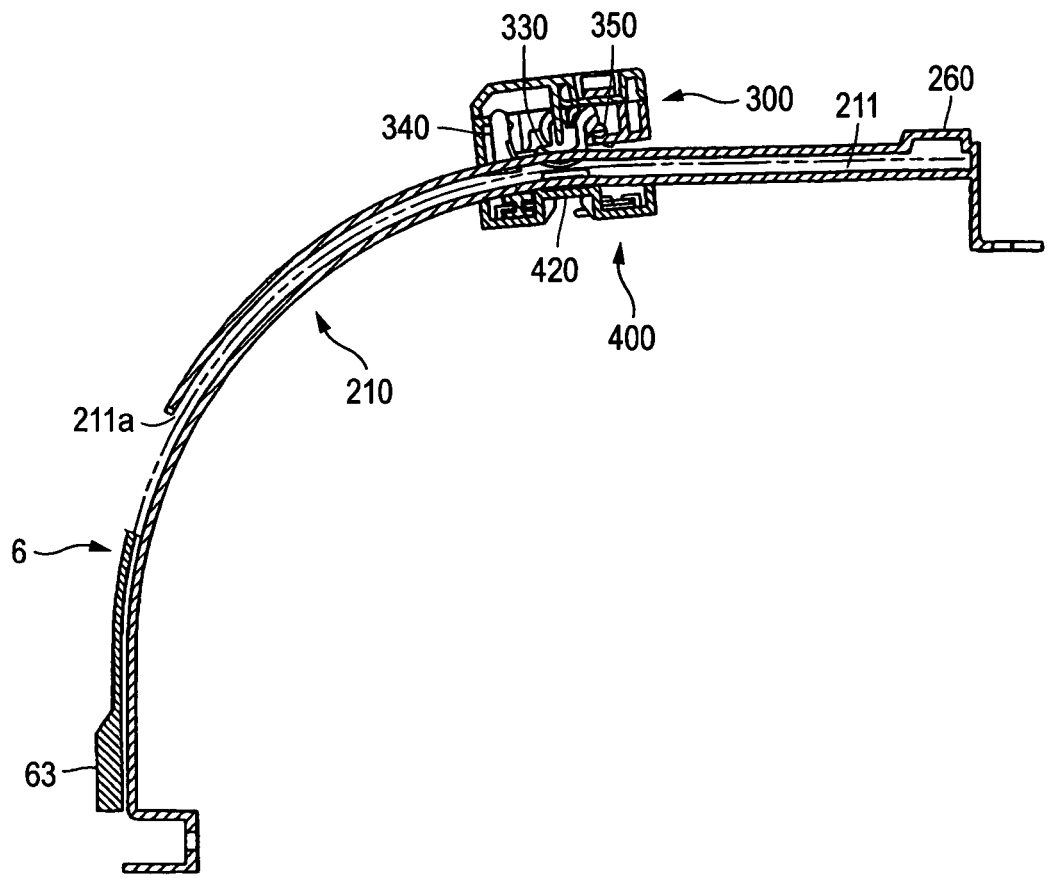
FIG. 15A is a view for explaining the procedure of filter cleaning and FIG. 15B is a schematic view of movement of the brush during filter cleaning.
Figure 15B:
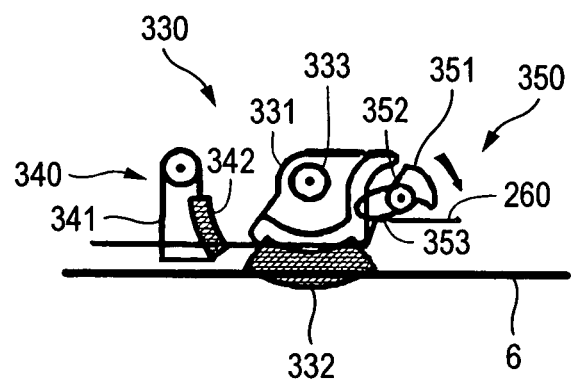

As seen from FIGS. 15A and 15B, when the dust box 300 moves to the vicinity of the upper end, the cam 353 of the locking potion 350 is brought into contact with the second guiding convex 260 formed at the end of the guide frame 210 and rotates in a releasing direction. Thus, the cleaning brush 330 results in a state where its free rotation is permitted.

Figure 3:
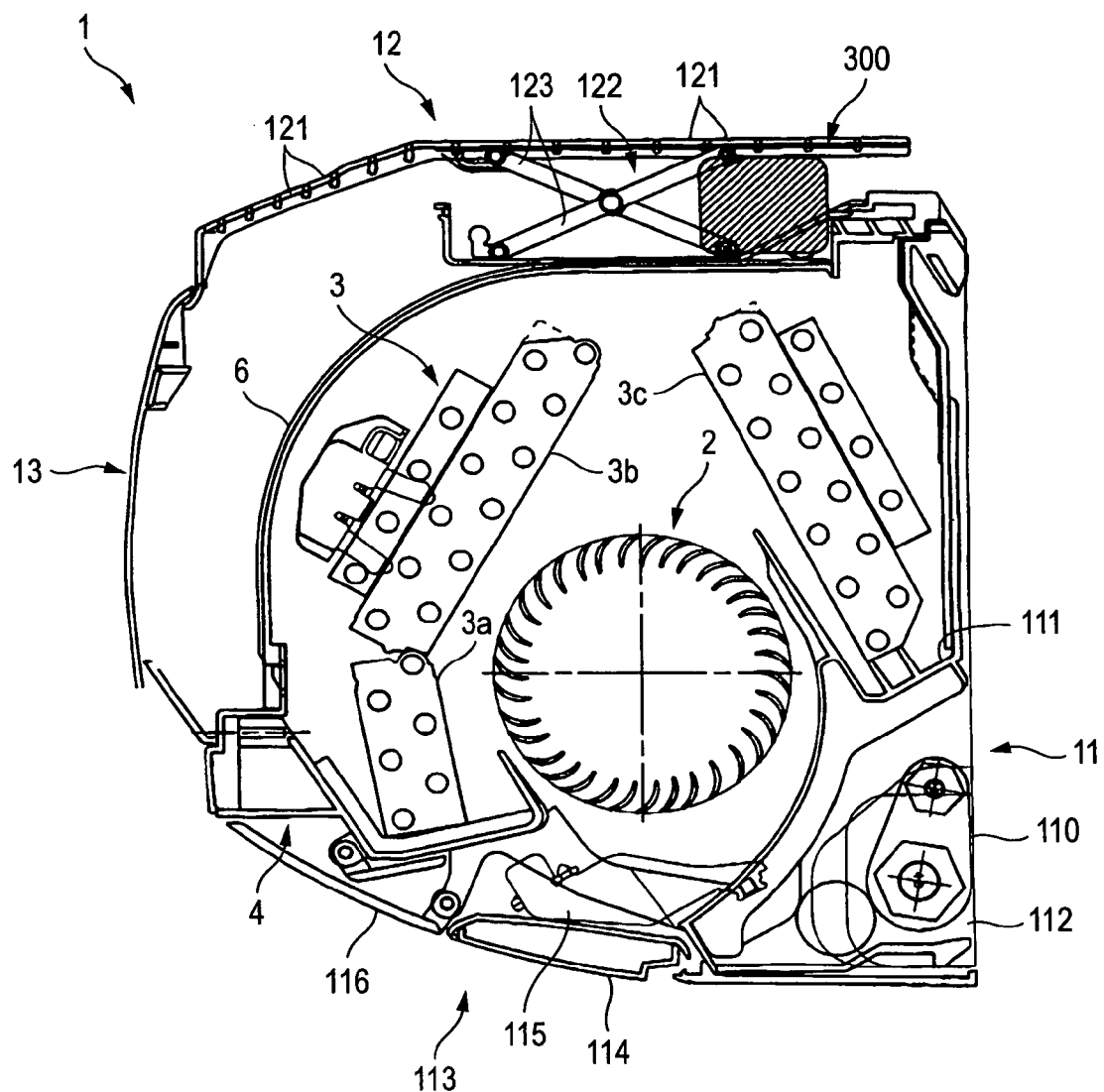
FIG. 3 is a sectional view of an example of the lifting structure of an upper panel.

In the case where a moving passage is created between the upper panel 12 as shown in FIG. 3 and the main frame 200 by lifting the upper panel 12 using the ascending/descending unit 122, the ascending/descending unit 122 is driven in cooperation with the movement of the dust box 300 to lift the upper panel 12, thereby assuring the moving passage.

Figure 16A:
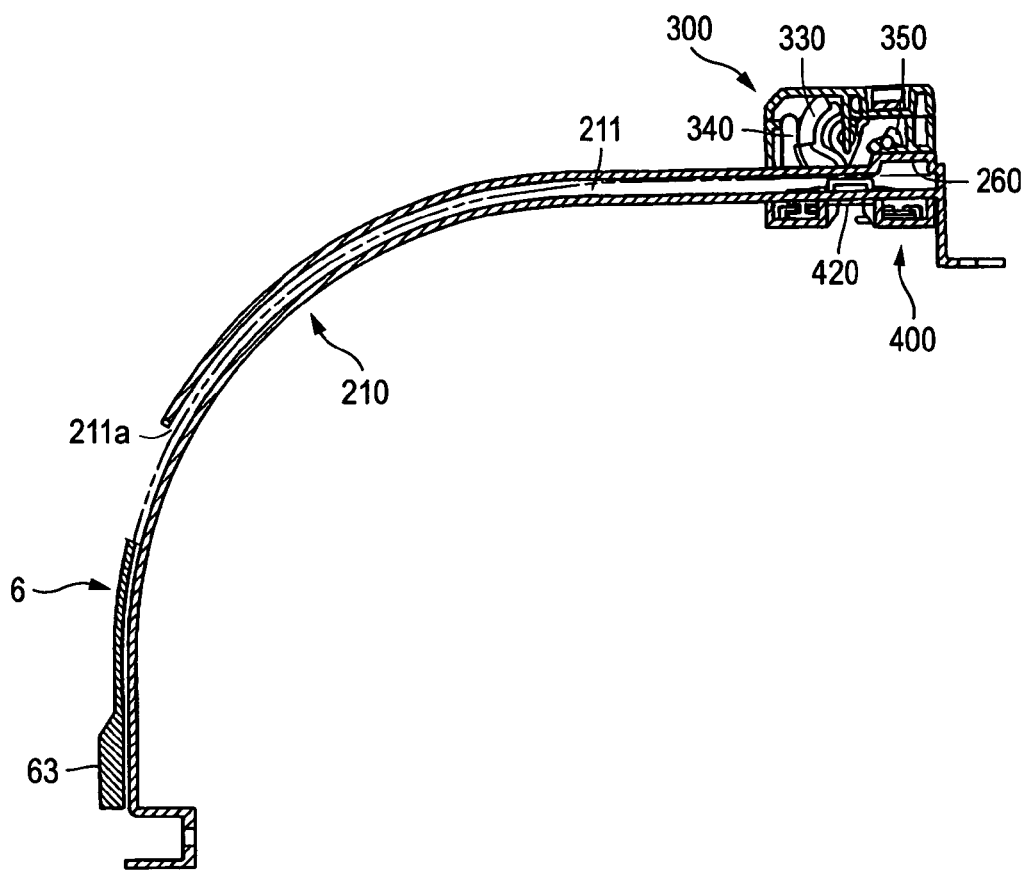
FIG. 16A is a view for explaining the procedure of filter cleaning and FIGS. 16B, 16C are a schematic view of move- ment of the brush during filter cleaning.
Figure 16B:
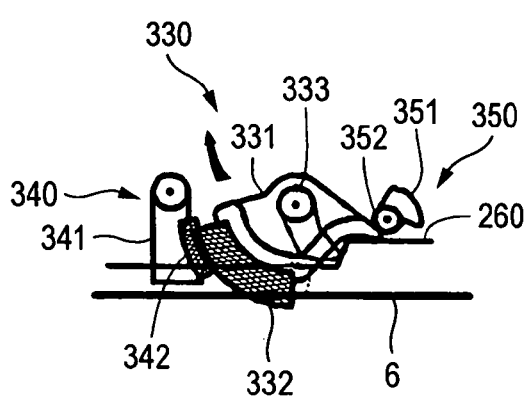

When the dust box 300 further moves in the released state, as seen from FIG. 16B, the cam 335 attached to the horizontal rotary shaft 333 of the cleaning brush 330 is lifted by the second guide convex 260. Thus, the cleaning brush 330 is forcibly moved toward the dust recovery brush 340.

Figure 16C:
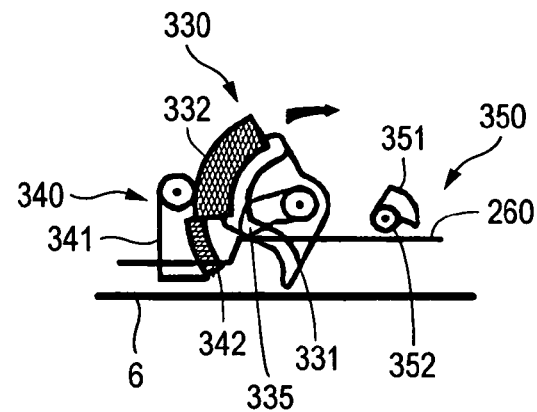

As seen from FIG. 16C, when the dust box 300 moves to the upper end position, the cleaning brush 330 is lifted while being in contact with the dust recovery brush 340 through the cam 335. At this time, the dust deposited on the hair tips of the cleaning brush 330 are scraped off by the dust recovery brush 340.

When the dust box 300 reaches the upper end of the guide frame 210, the driving motor 230 is rotated reversely. Correspondingly, the dust box 300 will be returned to the initial position (lower end position) along the guide frames 210.

Figure 17A:
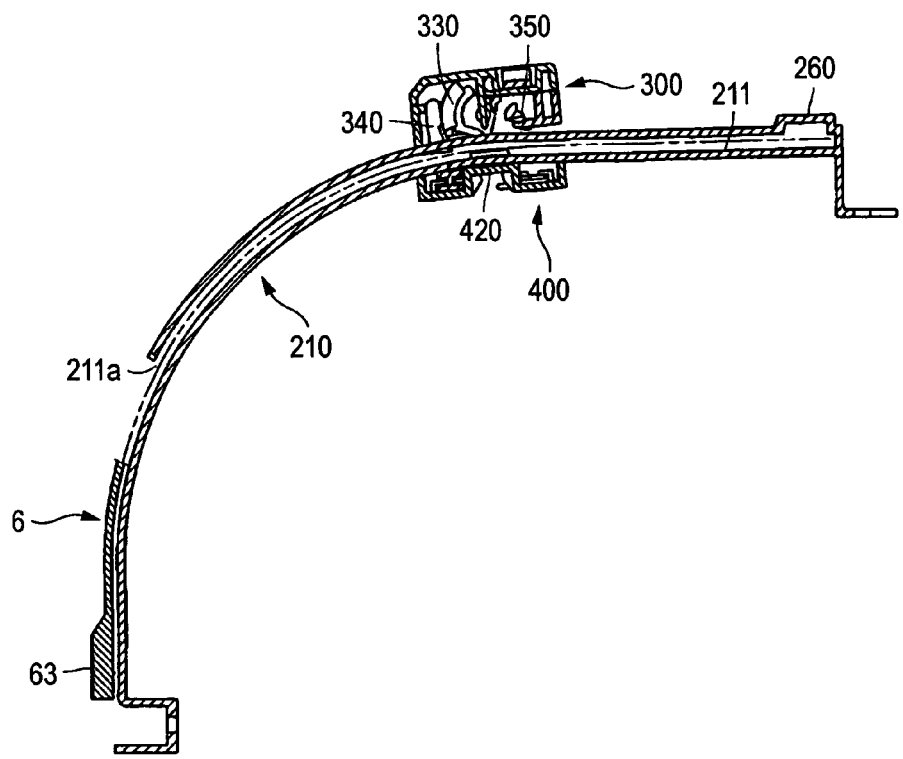
Figures 17B, 17D:
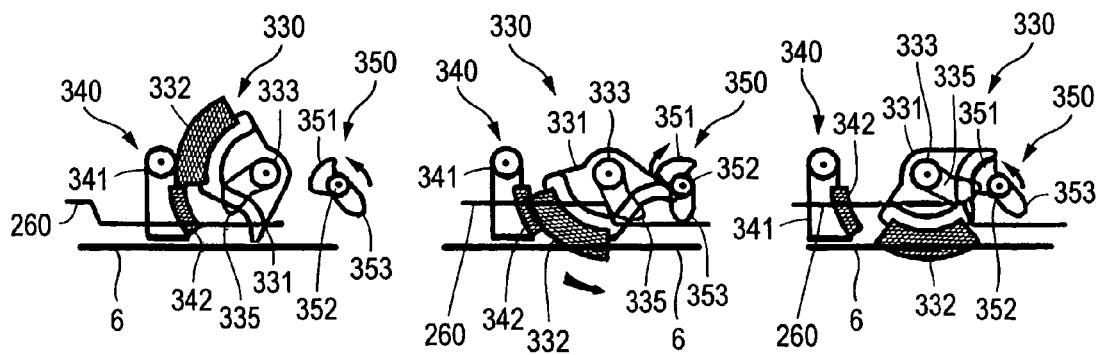

In this case, as seen from FIG. 17B, the cleaning brush 330 within the dust box 300 is returned in its lifted state, i.e. in non-contact with the filter 6. For this reason, it is possible to surely prevent the dust recovered by the cleaning brush 330 from being deposited again on the filter 6. Within the dust box 300, a cam restricting plane on which the cam 353 of the locking portion 350 abuts is formed so that that the cam 353 does not further rotates counterclockwise from the cam position illustrated in FIG. 17B.

When the dust box 300 reaches the vicinity of the lower end of the guide frame 210, as seen from FIG. 17C, as the cam 335 of the cleaning brush 330 rotates counterclockwise along the first guide convex 63 of the filter frame 61, the cleaning brush 330 rotates counterclockwise so that the brush body 332 moves toward the filter 6.

When the dust box 300 further moves, as seen from FIG. 17D, the cleaning brush 330 returns to the position touching with the filter 6 at nearly right angles. Simultaneously, with the rotation of the cleaning brush 330, the locking portion 350 is lifted so that it is locked again by the locking face 336 of the cleaning brush 330 by spring-urging. Thus, the rotation of the cleaning brush 330 is locked.

As a result of a series of operations described above which are carried out successively, the dust deposited on the filter 6 is trapped in the dust box 300, thereby completing the filter cleaning. Thus, the dust deposited on the cleaning brush 330 is recovered by the dust recovery brush 340 whenever the dust box 300 makes one round trip. For this reason, the cleaning brush can be always kept clean. In addition, the cleaning brush can be miniaturized so that its problowerion cost can be reduced.

Additionally, in this embodiment, the filter cleaning is carried out by making one round trip of the dust box 300. However, it is needless to say that the dust box 300 can make two or three round trips as required.

Further, this filter cleaning is carried out with the front surface of the filter 6 being supported by the dust box 300 and back surface thereof being supported by the filter receiving plate 400 so that dust will not be conveyed toward the heat exchanger 3 through the filter 6. So, even while the air conditioner is in operation, the filter cleaning can be carried out.

In recovering the dust accumulated within the dust box 300, it can be taken out safely and cleanly by inserting the suctioning mouth of a cleaner in the communicating window 323 made in the top panel 320. Further, by unhooking the hooks 329 of the top panel 320, the top panel 320 may be opened to wipe the interior of the dust box 300.

In this embodiment, the body cabinet 1 is explained with reference to a sealing wall type of air conditioner. However, the dust box according to this invention may be applied to an ordinary wall-attaching type air conditioner so that the configuration of the body cabinet can be optionally selected according to a required specification.

Second Embodiment

Figure 18:
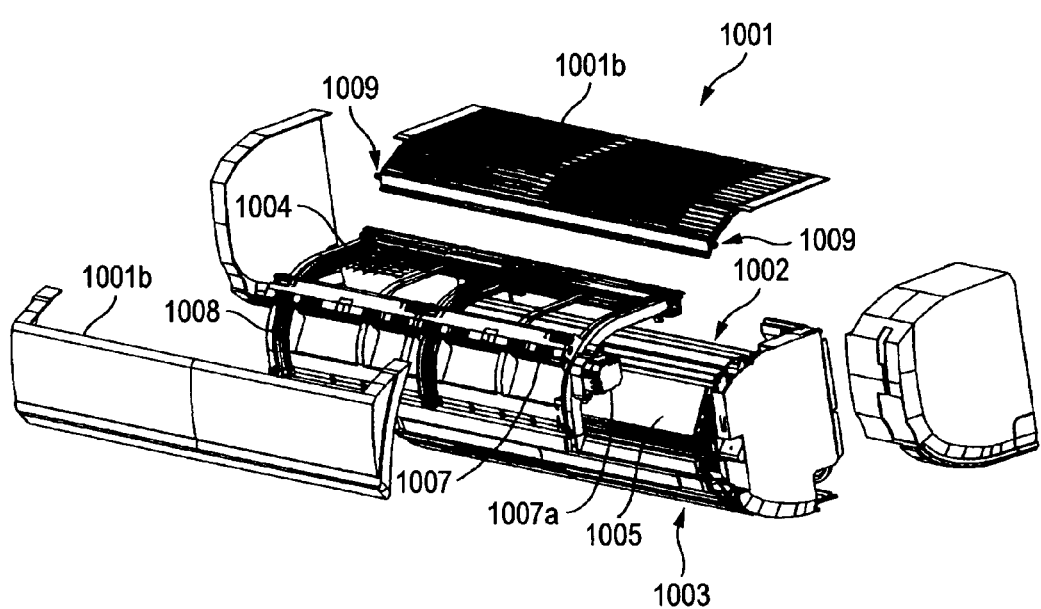
FIG. 18 is a perspective view of a second embodiment of an air conditioner according to this invention.
Figure 19A:
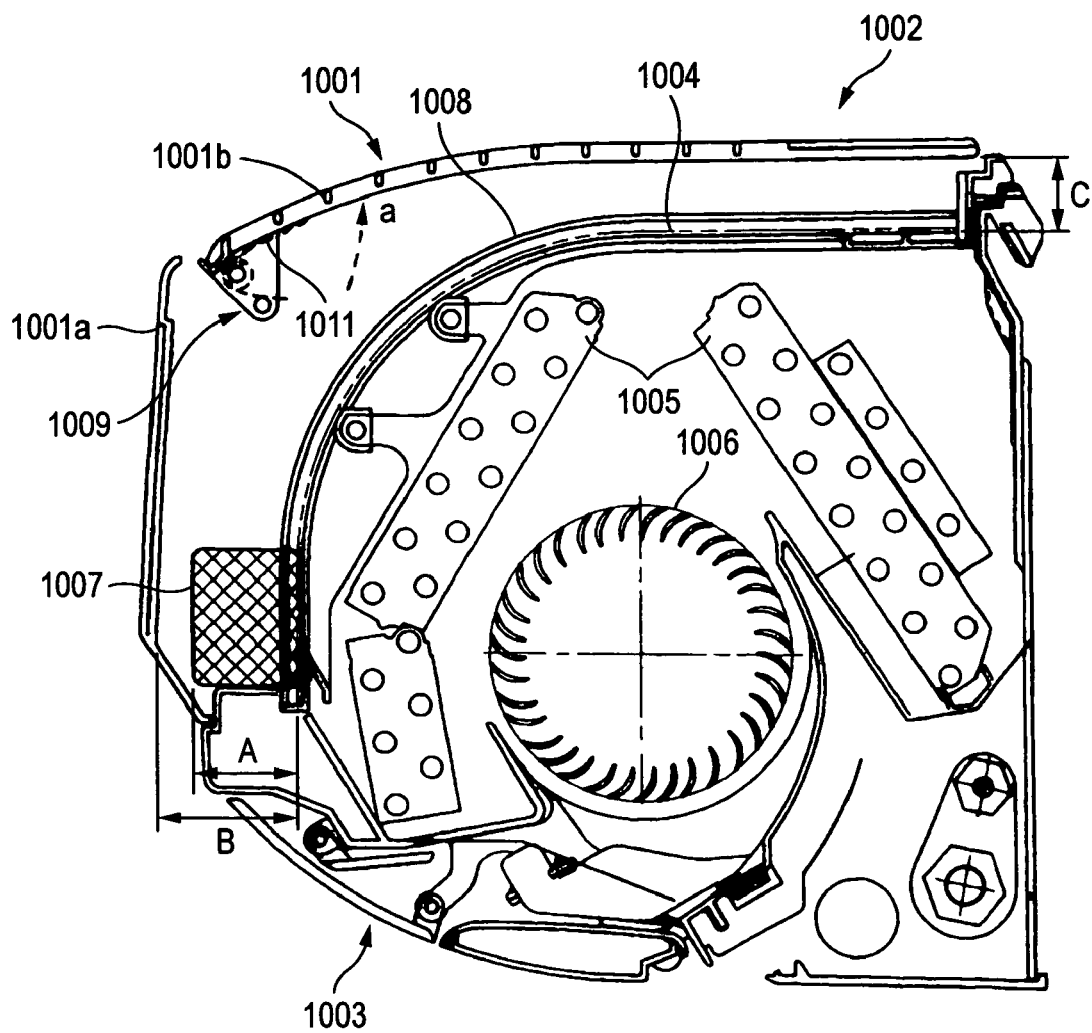
FIG. 19A is a first sectional view thereof.
Figure 19B:
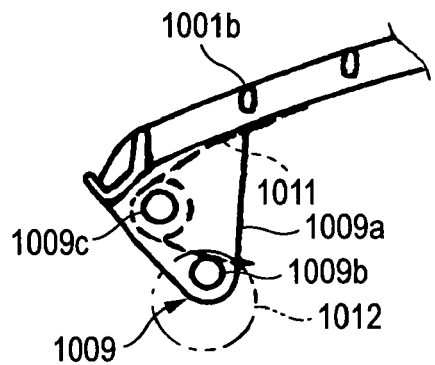
FIG. 19B is an enlarged view of the main part thereof.
Figure 20:
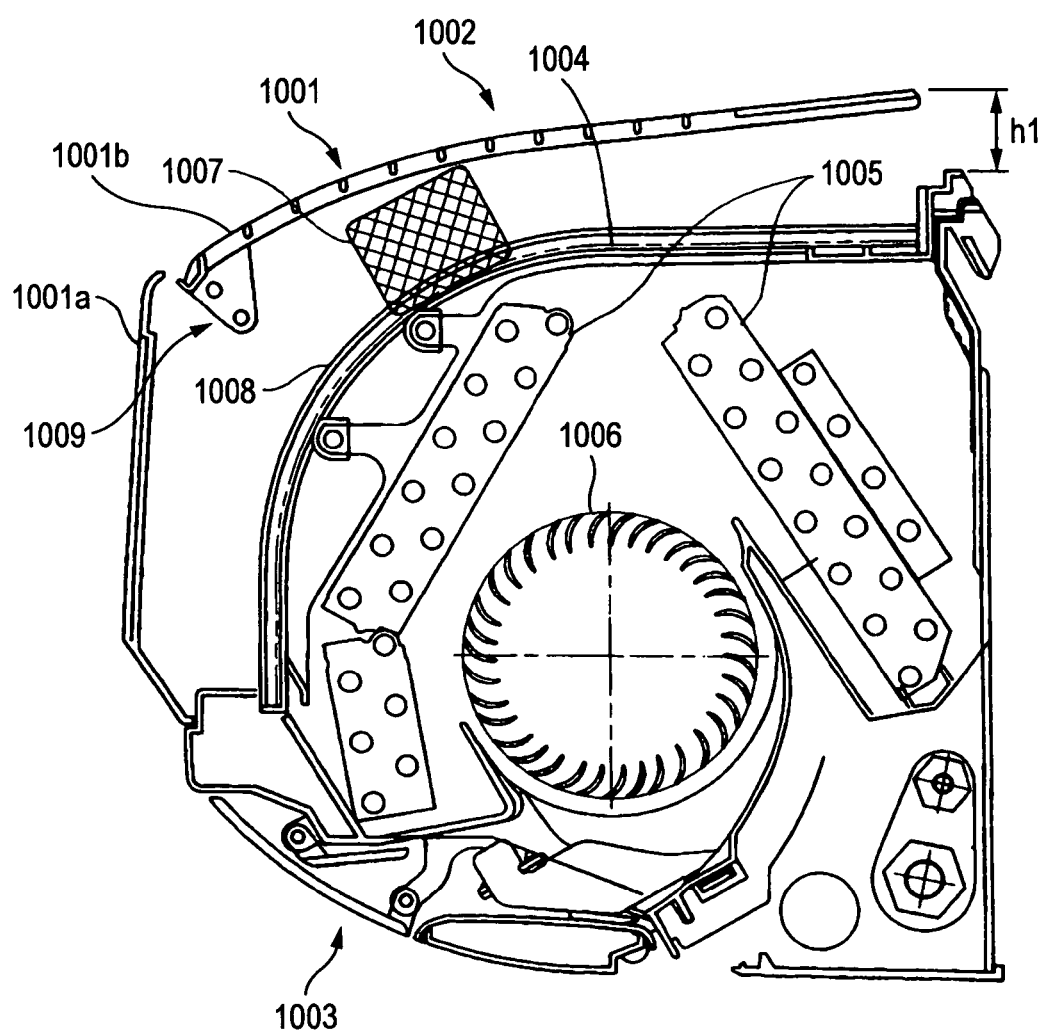
FIG. 20 is a second sectional view of the second embodi- ment of the air conditioner according to this invention.
Figure 21:
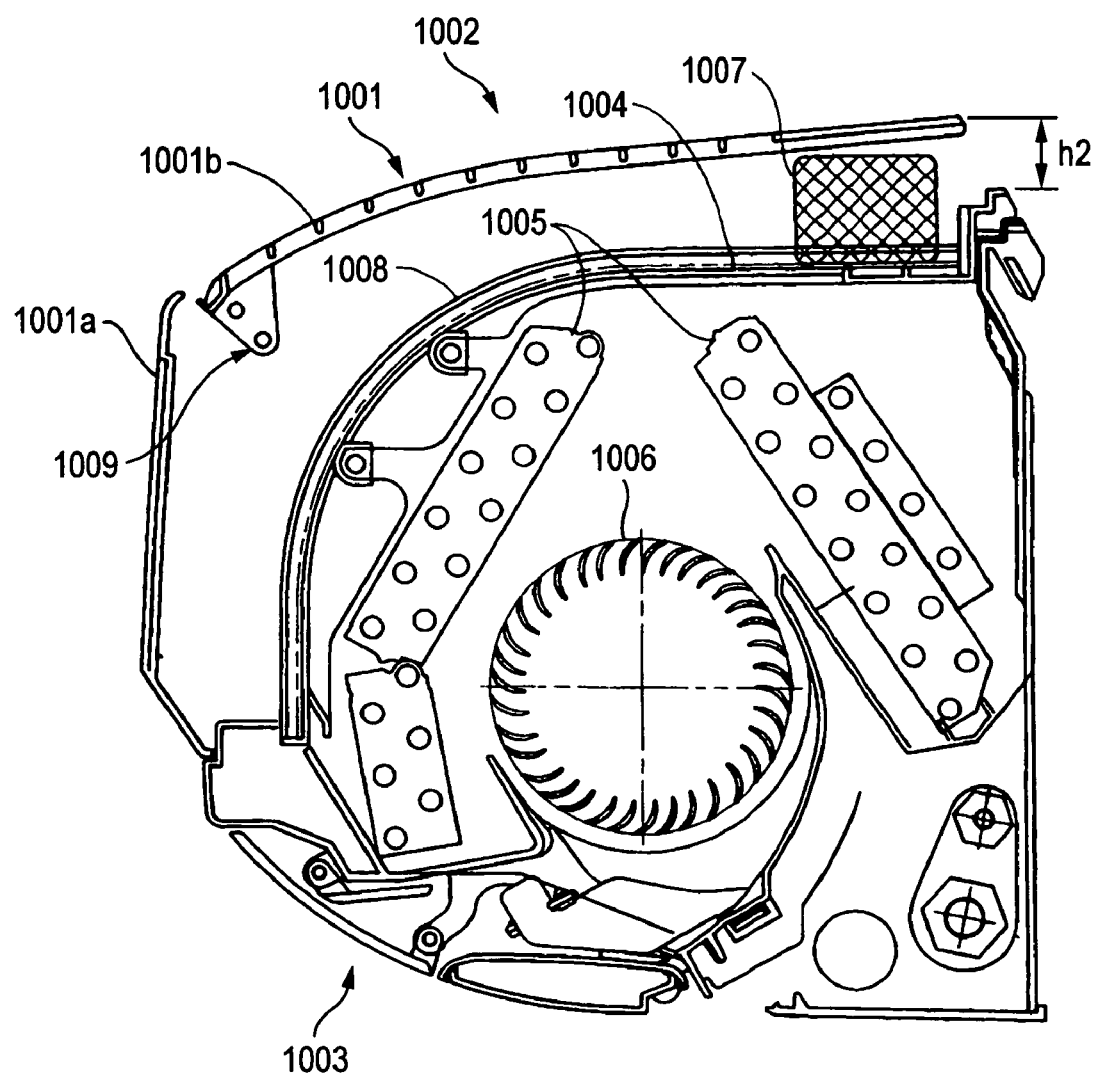
FIG. 21 is a third sectional view of the second embodiment of the air conditioner according to this invention.
Figure 22A:
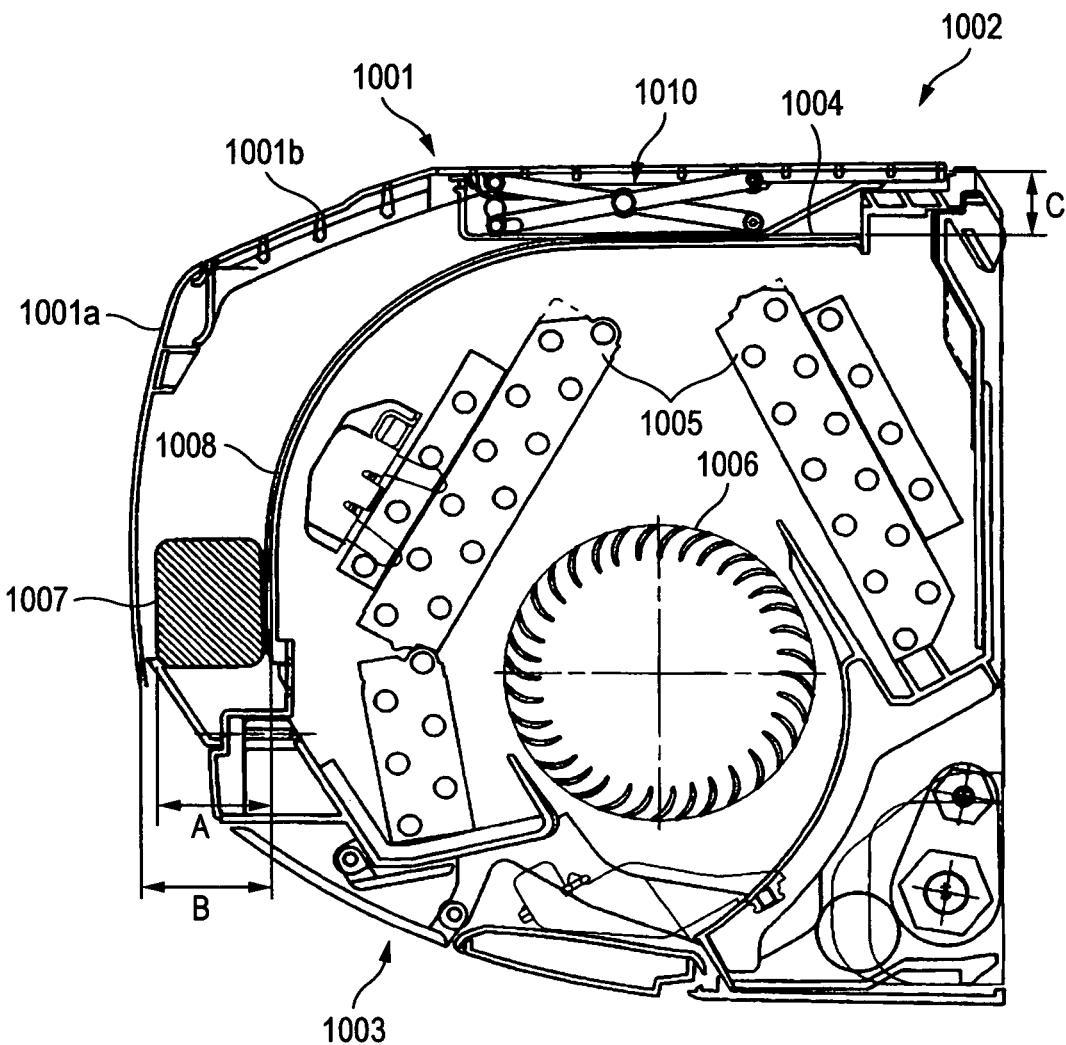
FIG. 22A is a first sectional view thereof.
Figure 22B:
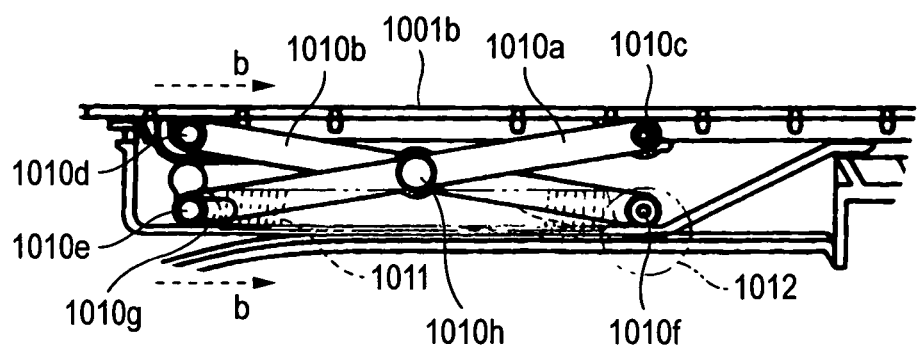
FIG. 22B is an enlarged view of the main part thereof.
Figure 23:
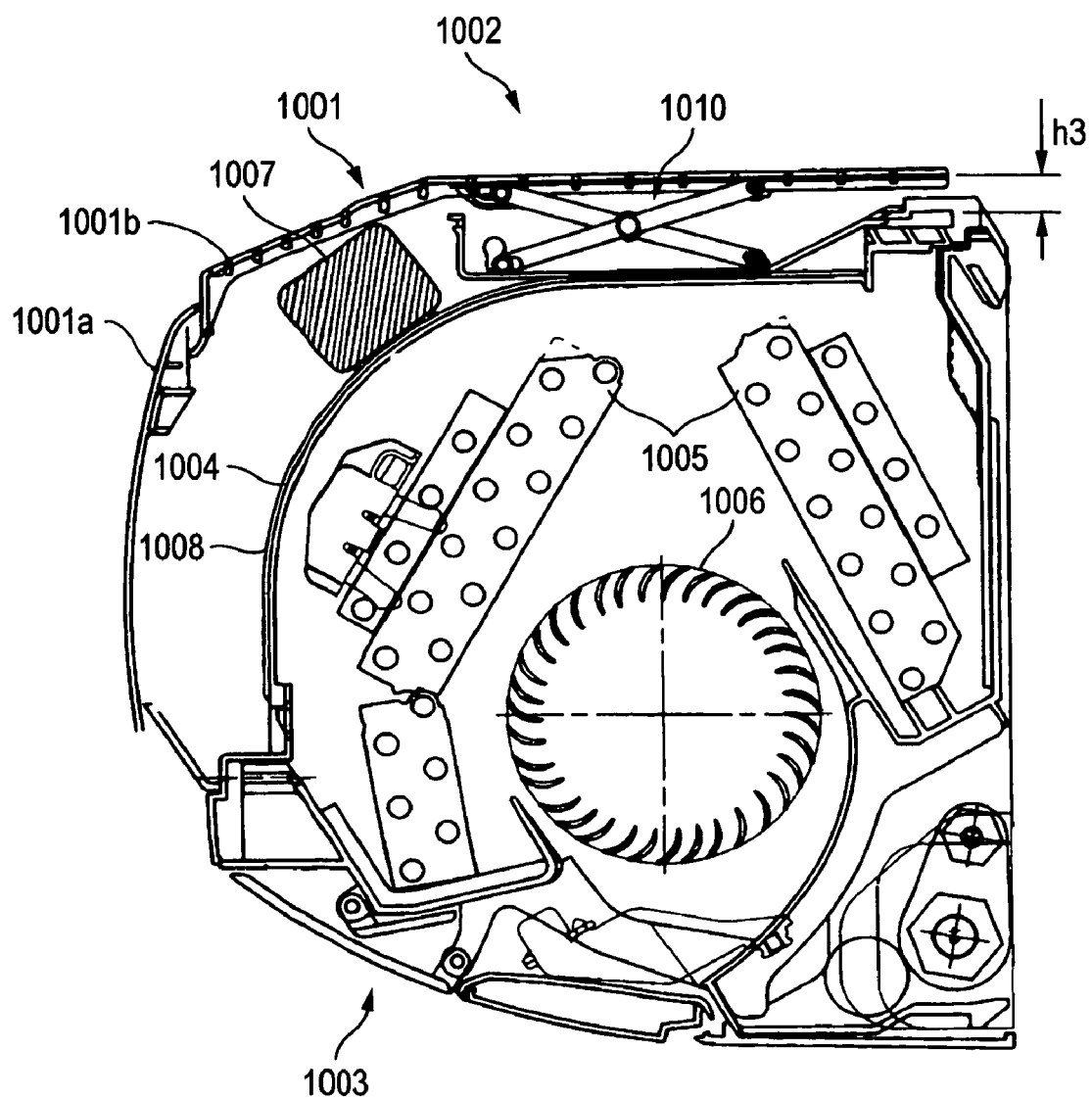
FIG. 23 is a second sectional view of the third embodiment of the air conditioner according to this invention.
Figure 24:
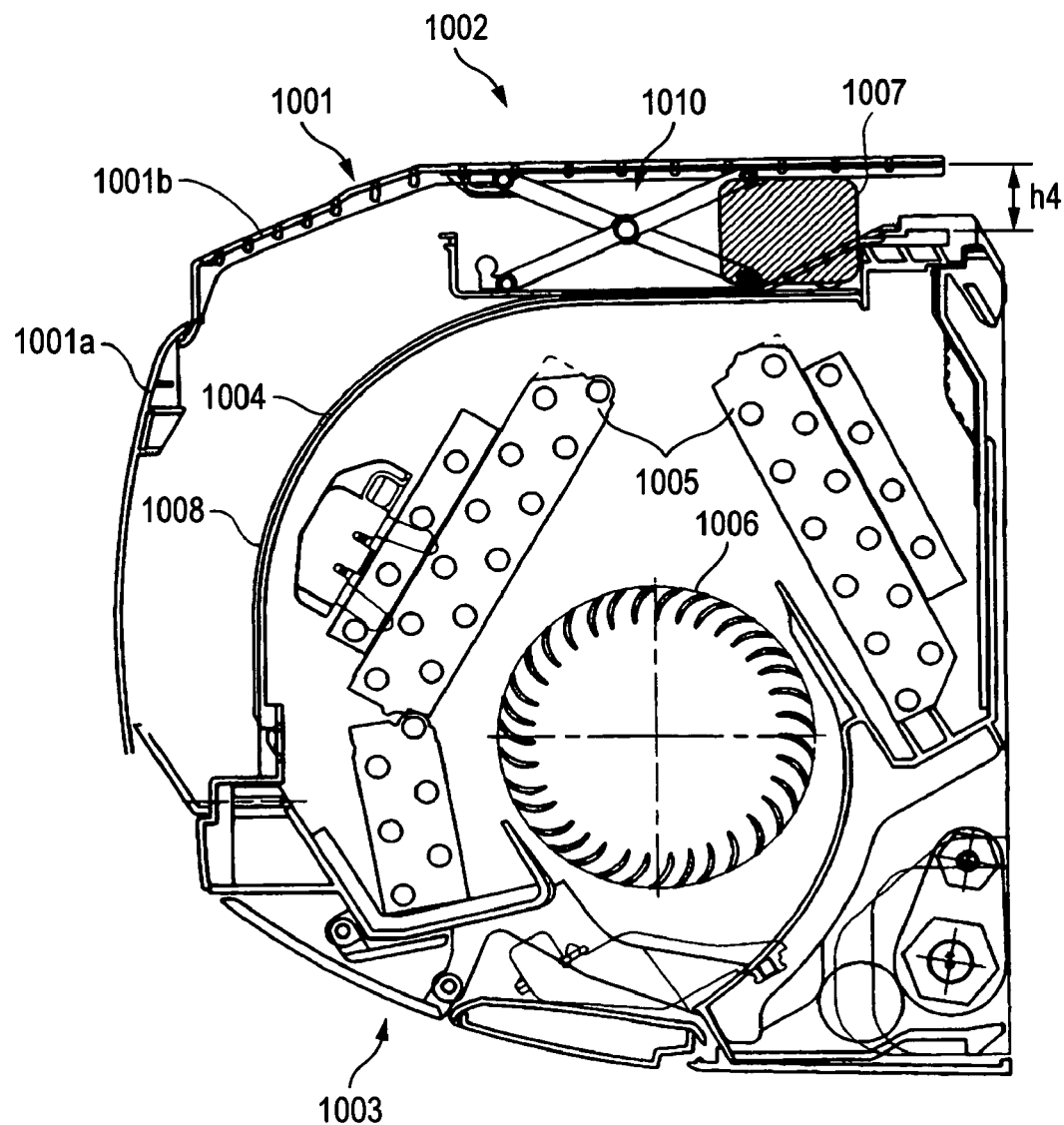
FIG. 24 is a third sectional view of the third embodiment of the air conditioner according to this invention.
Figure 25A:
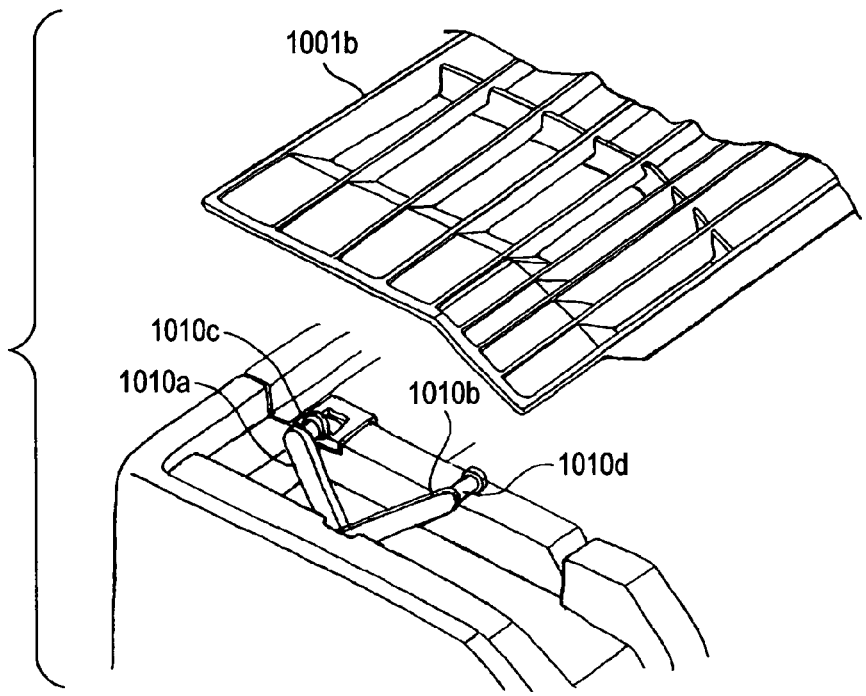
FIG. 25A is an exploded perspective view.
Figure 25B:
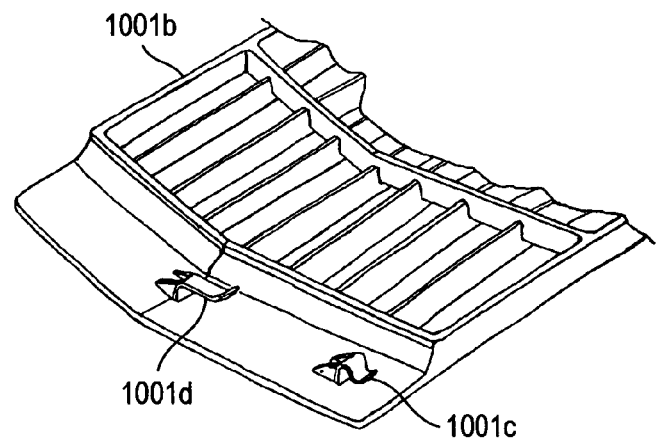
FIG. 25B is a perspective view of the main part of a back side showing the first linkage piece and second linkage piece of a top panel.

Further, FIG. 18 is a perspective view of a second embodiment of an air conditioner according to this invention. FIG. 19 is a view for explaining the second embodiment of this invention; FIG. 19A is a first sectional view thereof, and FIG. 19B is an enlarged view of the main part thereof. FIG. 20 is a second sectional view of the second embodiment of the air conditioner according to this invention. FIG. 21 is a third sectional view of the second embodiment of the air conditioner according to this invention. FIG. 22 is a view for explaining a third embodiment of an air conditioner according to this invention; FIG. 22A is a first sectional view thereof, and FIG. 22B is an enlarged view of the main part thereof. FIG. 23 is a second sectional view of the third embodiment of the air conditioner according to this invention. FIG. 24 is a third sectional view of the third embodiment of the air conditioner according to this invention. FIG. 25 is a view for explaining the main part of the third embodiment of the air conditioner according to this invention; FIG. 25A is an exploded perspective view, and FIG. 25B is a perspective view of the main part of a back side of a linkage pin attaching portion of a top panel.

The air conditioner according to this invention has a main body provided with a panel 1001 including a front panel 1001a and a top panel 100b, the main body incorporating an air passage connecting an air inlet 1002 and an air outlet 1003, an air filter 1004 for removing air dust sucked from the air inlet 1002, a heat exchanger 1005 for heat-exchanging clean air with the dust removed, and a blower fan 1006 for supplying the air heat-exchanged to the air outlet 1003.

A dedusting device 1007 is attached to the front face of the air filter 1004. The dedusting device is reciprocated along the surface of the air filter to remove the dust deposited on the air filter 1004. The dedusting device 1007 is driven by a driving motor 1007a in linkage therewith.

The top panel 1001b is forcibly outwardly opened in contact with the dedusting device 1007 as the dedusting device 1007 is operated. The dedusting device is smoothly operated by the guides 1008 formed on both sides of the air inlet 1002. Further, the top panel 1001b is returned to the initial position from the forcibly opened position owing to its own weight. In this case, a driving device is separately provided for forcibly outwardly opening the top panel 1001b and returning it to the initial position.

In such a configuration, the space for operating the dedusting device 1007 can be reduced as compared with the case where the dedusting device 1007 is reciprocated without being in contact with the top panel 1001b. This contributes to downsizing of the air conditioner.

The top panel 1001b may not be forcibly outwardly opened in contact with the dedusting device 1007 nor returned owing to its own weight. As indicated by broken line in FIGS. 19 and 20, the top panel 1001b may be opened/closed in linkage with a driving motor 1012.

Now referring to FIGS. 18 to 21, as the second embodiment, an explanation will be given of the configuration and operation in which the top panel 1001b is forcibly outwardly opened in contact with the dedusting device 1007.

The dedusting device 1007, as seen from FIG. 19A as a first state, is constructed with a dimension A from the air filter 1004 to the case outer face of the dedusting device 1007. The dedusting device 1007 is accommodated within a range of dimension B from the air filter 1004 to the front panel 1001a, opposite to the lower end of the front face of the air filter 1004 in a relationship of "dimension A<dimension B".

The top panel 1001b is adapted so that it can be pivoted by a pivoting member 1009.

Further, the top panel 1001b is mounted on the upper part of the air conditioner in a relationship of "dimension C<dimension A" where C represents a space between the top panel 1001b and air filter 1004.

In such a configuration, the space C can be reduced as the dedusting device 1007 as compared with the case where the dedusting device 1007 is reciprocated without being in contact with the top panel 100b. This contributes to downsizing of the air conditioner.

Additionally, where the dedusting device 1007 is driven by the driving motor 1007a to forcibly outwardly open the top panel 1001b while being pivoted, the driving force enough to forcibly open the top panel 1001b against its own weight is required. So, in order to assist the driving force, the top panel 1001b may be urged upward by an urging spring 1011.

Specifically, the pivoting member 1009, as seen from FIGS. 18 and 19B, is constructed so that a supporting shaft 1009b is protruded from flanges 1009a continuously formed on both sides of the front end of the top panel 1001b so that the dedusting device 1007 is not brought into contact therewith. By an urging spring 1011 supported by a projected spring-urged pin 1009c in the vicinity of the supporting shaft 109b, the top panel 1001b may be urged as indicated by a broken-line arrow a in FIG. 19A.

The dedusting device 1007 is driven by the driving motor 1007a so that it is operated from the position indicated in FIG. 19A as the first state to the position indicated in FIG. 20 as a second state. Thus, a part of the dedusting device 1007 is brought into contact with the top panel 1001b so that the top panel 10011b is forcibly outwardly opened against its own weight by a movement quantity h1 indicated in FIG. 20.

The dedusting device 1007 is further driven by the driving motor 1007a so that it is operated from the position of the above second state to the position indicated as a third state in FIG. 21. Thus, the top panel 1001b is forcibly outwardly opened by the dedusting device 1007 by a movement quantity h2 indicated in FIG. 21.

In this case, a relationship of "movement quantity h2<movement quantity h1" holds. In this way, by a simple cost-effective structure in which the top panel 1001b is pivoted by the pivoting member 1009, it is forcibly opened to the position indicated as the second state in FIG. 20 and thereafter is returned to the position indicated as the third state in FIG. 21 owing to its own weight.

As described above, the dedusting device 1007 is operated from the first state to the third state, and likewise the dedusting device 1007 is returned from the third state to the first state. By such a reciprocation of the dedusting device, the entire surface of the air filter 1004 can be dedusted finely.

Further, when the dedusting device 1007 has been returned from the third state to the first state, the top panel 1001b is returned to its normal position as indicated in FIG. 19A owing its own weight. This reduces the vertical size of the air conditioner and contributes to its miniaturization.

Third Embodiment

Now referring to FIGS. 8 and 22 to 25, as the third embodiment, an explanation will be given of the configuration and operation in which the top panel 1001b is forcibly outwardly opened in contact with the dedusting device 1007.

The dedusting device 1007, as seen from FIG. 22A as a first state, is constructed with a dimension A from the air filter 1004 to the outer face of the case of the dedusting device 1007. The dedusting device 1007 is accommodated within a range of dimension B from the opposite air filter 1004 to the front panel 1001a, opposite to the lower end of the front face of the air filter 1004 in a relationship of "dimension A<dimension B".

The top panel 1001b is adapted so that it can be translated vertically by a linkage mechanism 1010 provided on both sides of the top panel 1001b so that the dedusting device is not brought into contact therewith.

Further, the top panel 1001b is mounted on the upper part of the air conditioner in a relationship of "dimension C<dimension A" where C represents a space between the top panel 1001b and air filter 1004.

In such a configuration, the space C can be reduced as compared with the case where the dedusting device 1007 is reciprocated without being in contact with the top panel 1001b. This contributes to downsizing of the air conditioner.

Additionally, where the dedusting device 1007 is driven by the driving motor 1007a to forcibly outwardly open the top panel 1001b while being translated, the driving force enough to forcibly open the top panel 1001b against its own weight is required. So, in order to assist the driving force, the top panel 1001b may be urged upward by an urging spring 1011.

Specifically, the linkage mechanism 1010, as seen from FIG. 22B, is constructed so as to include, on both sides of the top panel 100b, a first link 1010a equipped with a first linkage pin 1010c and a first slide pin 1010e at its both ends, a second link 1010b equipped with a second linkage pin 1010f and a second slide pin 1010d at its both ends, a pivoting member 1010h for pivoting the first link 1010a and the second link 1010b on each other, and a slide groove 1010g for supporting the first slide pin 1010e slidably to and fro. In such a construction, by an urging spring 1011 stretched between the first slide pin 1010e and the second linkage pin 1010f, the first slide pin 1010e and the second slide pin 1010d may be urged as indicated by a broken arrow line b in FIG. 22B so that the top panel 1001b is urged upward.

The dedusting device 1007 is driven by the driving motor 1007a so that it is operated from the position indicated in FIG. 22A as the first state to the position indicated in FIG. 23 as a second state. Thus, a part of the dedusting device 1007 is brought into contact with the top panel 1001b so that the top panel 1001b is forcibly outwardly opened against its own weight by a movement quantity h3 indicated in FIG. 23.

The dedusting device 1007 is further driven by the driving motor 1007a so that it is operated from the position of the above second state to the position indicated as a third state in FIG. 24. Thus, the top panel 1001b is forcibly outwardly opened by the dedusting device 1007 by a movement quantity h4 indicated in FIG. 24.

In this case, the relationship of "movement quantity h3<movement quantity h4" holds. The linkage mechanism 1010 in which the top panel 1001b is translated is more complicated in structure than the pivoting member 1009 explained in the second embodiment. However, the top panel 1001b is forcibly opened to the position indicated as the second state in FIG. 23 and thereafter is sequentially outwardly opened to the position as the third state indicated in FIG. 24. Such a motion of the top panel 1001b looks nice.

As described above, the dedusting device 1007 is operated from the first state to the third state, and likewise the dedusting device 1007 is returned from the third state to the first state. By such a reciprocation of the dedusting device, the entire surface of the air filter 1004 can be dedusted finely.

Further, when the dedusting device 1007 has been returned from the third state to the first state, the top panel 1001b is returned to its normal position as indicated in FIG. 22A owing its own weight. This reduces the vertical size of the air conditioner and contributes to its miniaturization.

Additionally, the linkage mechanism 1010, as seen from FIGS. 22 to 24, is arranged at the central portion in the fore-and-aft direction of the top panel 100b. Thus, the top panel 1001b can be supported translatably and stably.

Further, on the rear surface of the top panel 1001b shown in FIG. 25A, as seen from FIG. 25B, there are provided a first linkage piece 1001c corresponding to the first linkage pin 1010c and a second linkage piece 1001d corresponding to the second slide pin 1101d, respectively. The first linkage pin 1010c is pivotally linked with the first linkage piece 1001c and the second slide pin 1010d is slidably linked with the second linkage piece 1001d so that the top panel 1001d can be translated vertically.

Fourth Embodiment

Further, the horizontal beam member 2201 connecting the respective upper ends of the guide frames 2210 has a filter supporting portion 2202 on the tip side for holding a tip 2064 of the air filter 2006 which is inserted from the inserting mouths 2211a and pushed, as it is, along the filter rails 2211 corresponding to both sides of the air filter 2006. In order that the tip 2064 of the air filter 2006 can be smoothly guided and held without being caught or taken off even if it is deformed, as seen from FIGS. 26A, 26B and FIGS. 27A, 27B, the filter supporting portion 2202 is provided with a guiding unit 2100 having an inclination angle θ corresponding to the entire width of the air filter 2006 to guide the air filter 2006 into the inner part of the main frame 2200.

Figure 26A:
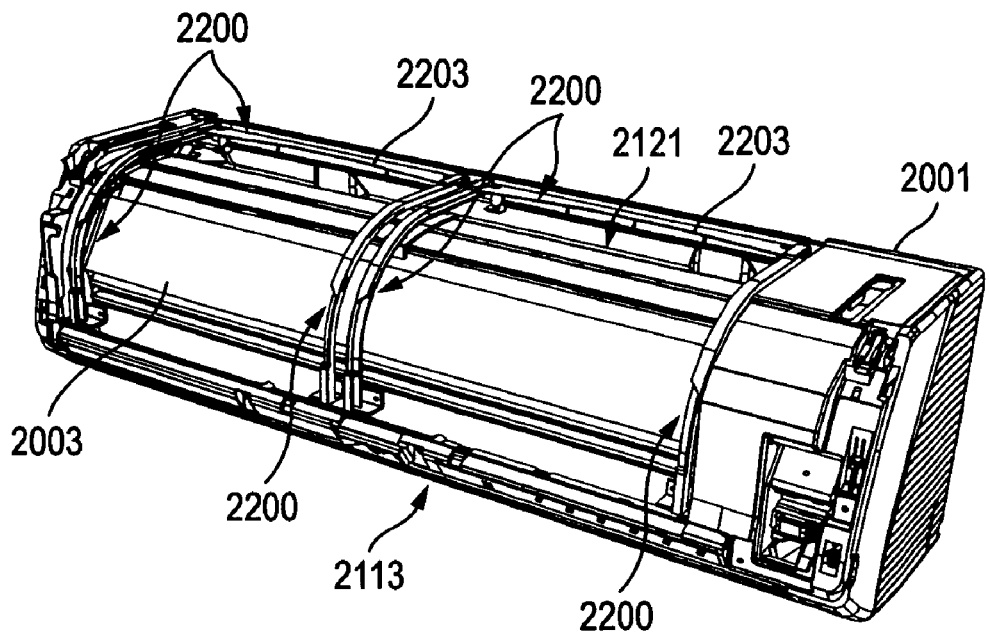
FIG. 26A is a perspective view of the state where an upper panel and an air filter are removed.
Figure 26B:
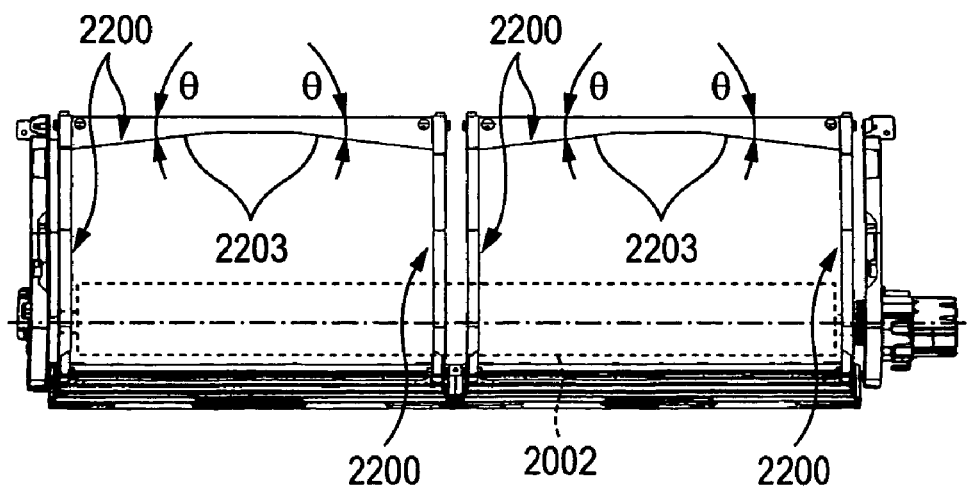
FIG. 26B is a plan view of the state where the upper panel and the air filter are removed.

The guiding unit 2100, for example, as seen from FIG. 26B, has a frame guide 2203 formed in a <-shape with the front end having an inclination angle θ when viewed in plan as the filter supporting portion 2202 for the beam member 2201 connecting the upper ends of the main frame 2200, which corresponds to the tip 2064 of the air filter 2006.

Figure 27A:
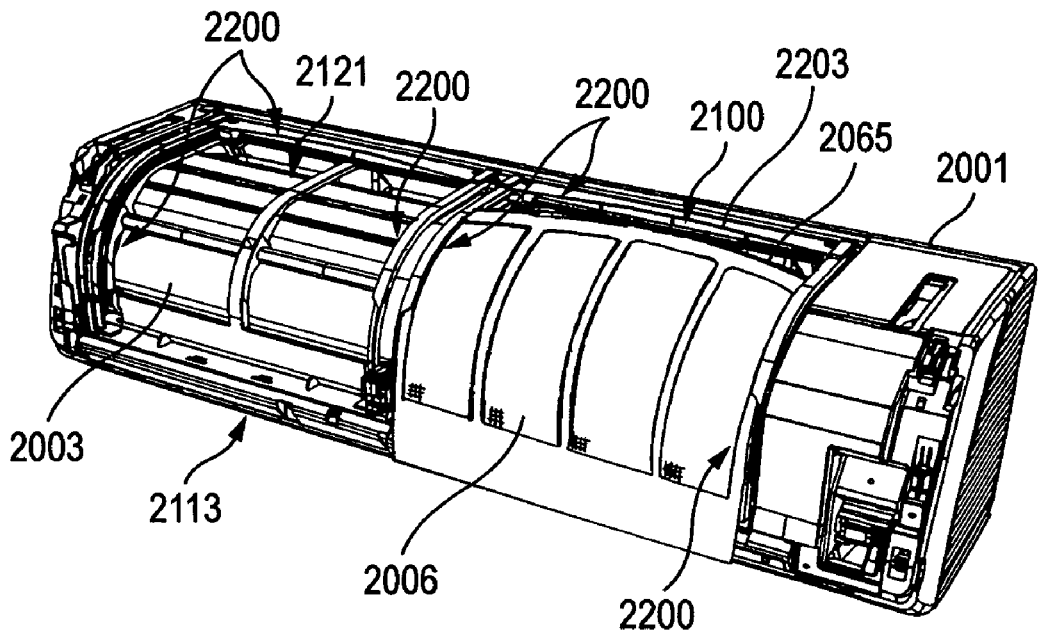
FIG. 27A is a perspective view of the state where the air filter is being mounted.
Figure 27B:
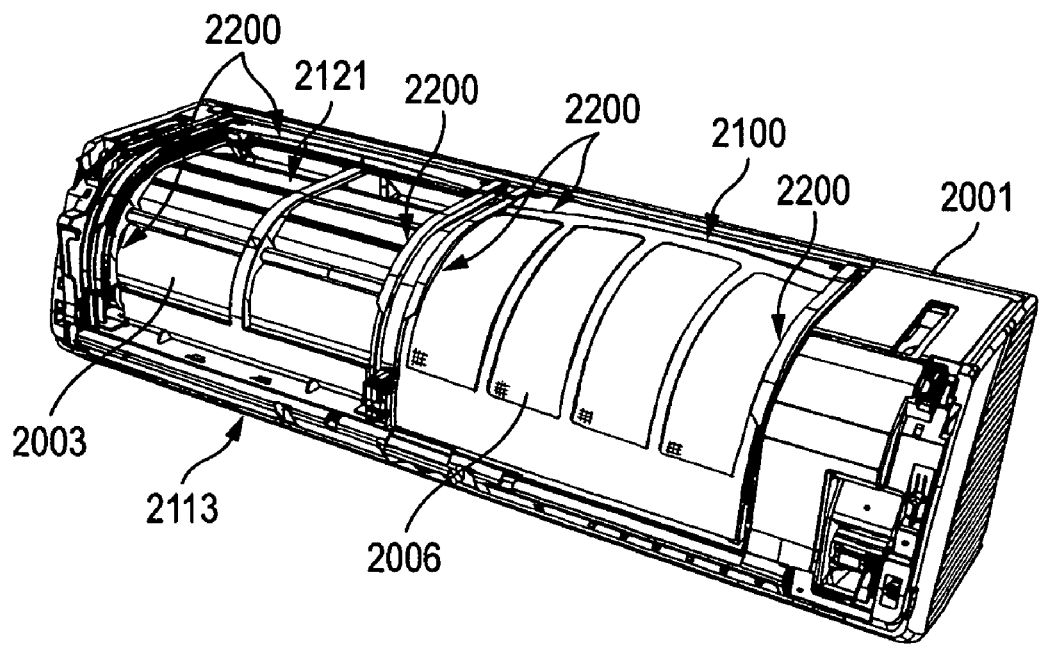
FIG. 27B is a perspective view of the state where the air filter has been mounted.

Thus, as seen from FIG. 27A, when the air filter 2006 is inserted from the inserting mouths 2211a and pushed, as it is, along the filter rails 2211, even if the tip 2064 thereof is slightly deformed, as seen from FIG. 27B, the air filter 2006 is smoothly guided and mounted into the filter supporting portion 2202 while the area from both sides to the center of the tip 2064 is sequentially elastically deformed by the frame guide 2203.

Figure 28A:
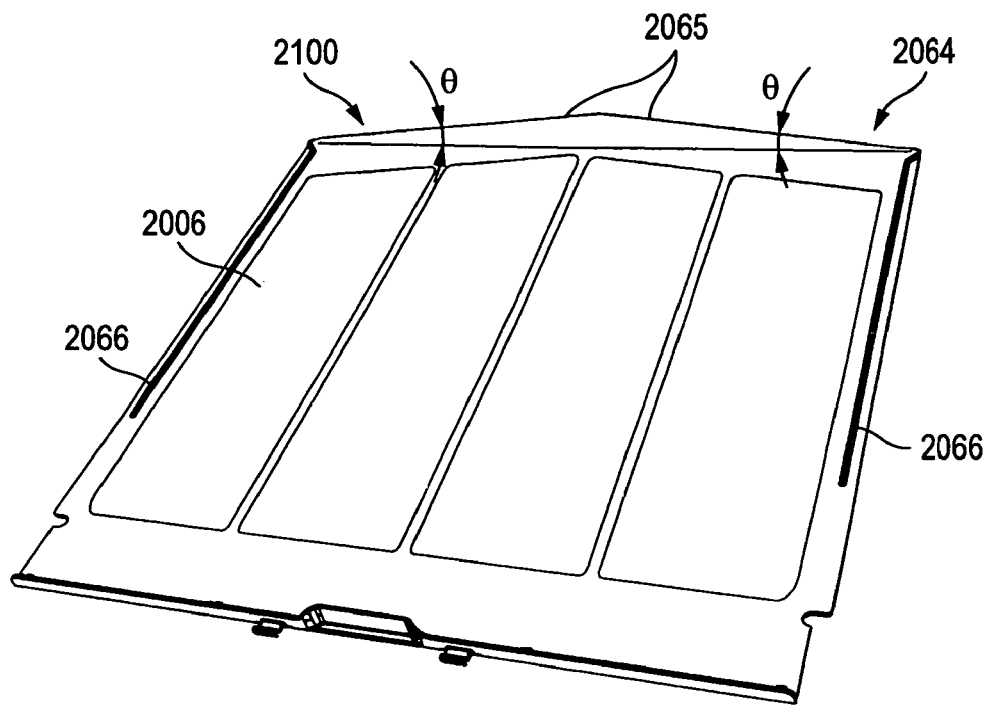
FIGS. 28A and 28B are perspective views of examples in which the tip of the air filter is given an inclination angle.
Figure 28B:
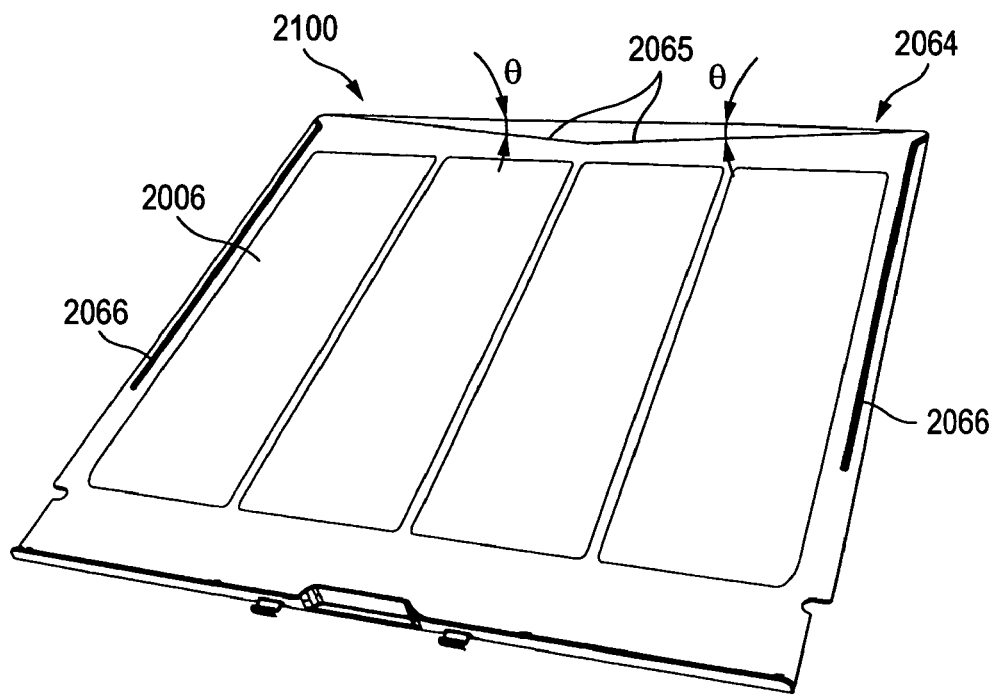

As another example of the guiding unit 2100, as seen from FIGS. 28A and 28B, it may be a filter guide 2065 having an inclination angle θ inclining in the width direction of the air filter 2006 from both ends to the center of the tip 2064 of the air filter 2006 to guide the air filter 2006 into the inner part of the main frame 2200.

Thus, when the tip 2064 of the air filer 2006 is guided into the filter supporting portion 2202 of the beam member 2201, even if the tip 2064 is slightly deformed, since the filter guide 2065 formed at the tip 2064 of the air filter 2006 is engaged with the frame guide 2203, the air filter 2006 is smoothly guided and mounted into the filter supporting portion 2202 while the tip 2064 is sequentially elastically deformed by the frame guide 2203.

Specifically, as the guiding unit 2100 for guiding the tip 2064 of the air filter 2006 into the filter supporting portion 2202 of the beam member 2201 which is the inner part at the upper end of the main frame 2200, the above filter guide 2065 and the frame guide 2203 are combined with each other in their preferred shape so that the tip 2064 of the air filter 2006 can be guided into the filter supporting portion 2202 more smoothly.

Figure 29A:
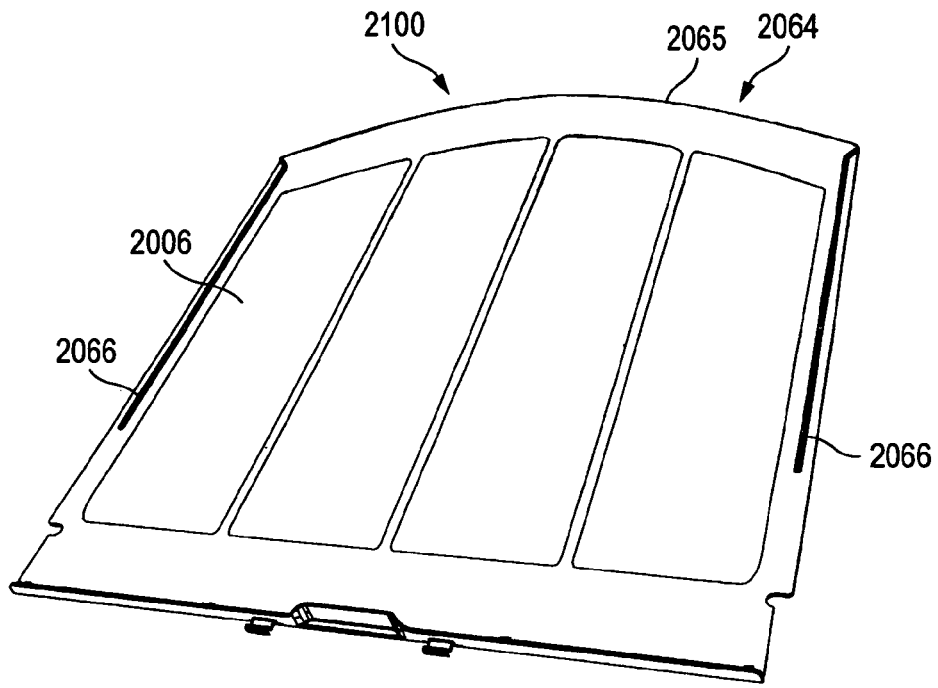
FIGS. 29A and 29B are perspective views of examples in which the tip of the air filter is curved in a convex shape, respectively.
Figure 29B:
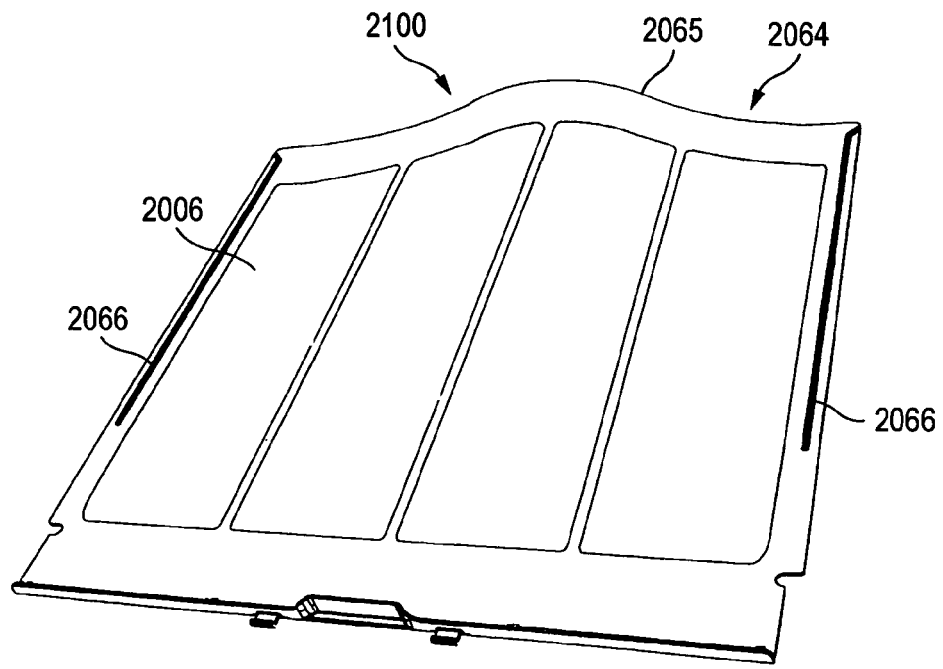

Further, as seen from FIGS. 29A and 29B, the guiding unit 2100 may be the filter guide 2065 with the area from both sides to the center of the tip 2064 of the air filer 2006 being curved in a convex shape.

Incidentally, the filter guide 2065 curved, although not shown, may be curved in a concave shape from both sides toward the center thereof.

Thus, as in the above case where the filter guide 2065 has the inclination angle θ corresponding to the entire width of the air filter 2006, the filter guide 2065 can be more smoothly engaged with the frame guide 2203. For this reason, the air filter 2006 is more smoothly guided and mounted into the filter supporting portion 2202 of the beam member 2201 while the area from both sides to the center of the tip 2064 of the air filter 2006 is sequentially elastically deformed by the frame guide 2203.

Specifically, in addition to the advantage obtained by the above filter guide 2065, the frame guide 2203 and the filter guide 2065 are combined with each other in their preferred shape so that the tip 2064 of the air filter 2006 can be more smoothly guided into the filter supporting portion 2202 which constitutes the inner part at the upper end of the main frame 2201.

In this case, the guide frame 2210 provided with the filter rail 2211 is supported at both ends so that a filter take-off preventing unit restricts deformation of the filter guide 2065 owing to forcible extension at the central area when the air filter 2006 is mounted, thereby preventing the air filter 2006 being taken off from the filter rail 2211.

Figure 30:
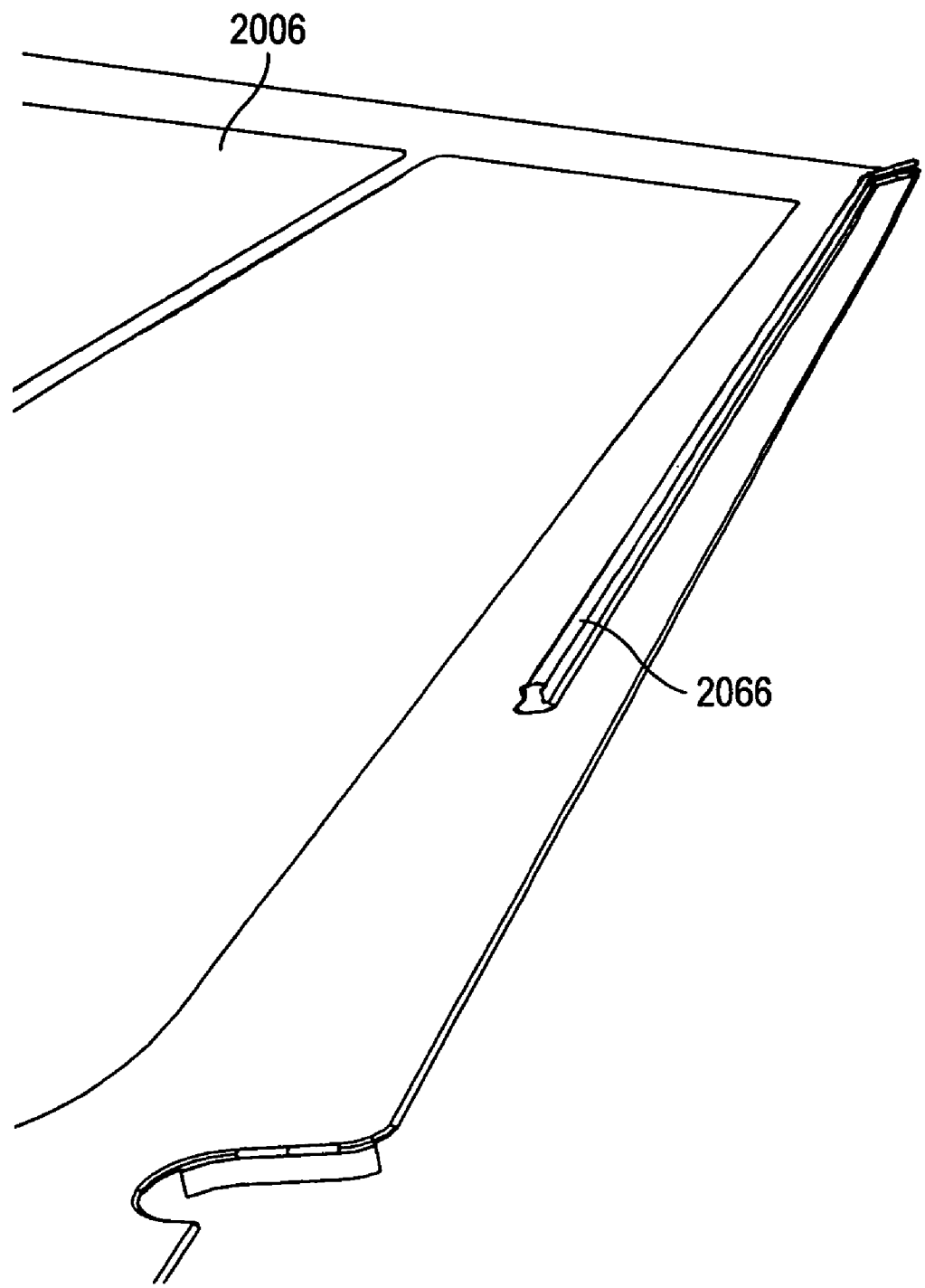
FIG. 30 is a perspective view of the main part of the air filter.
Figure 31A:
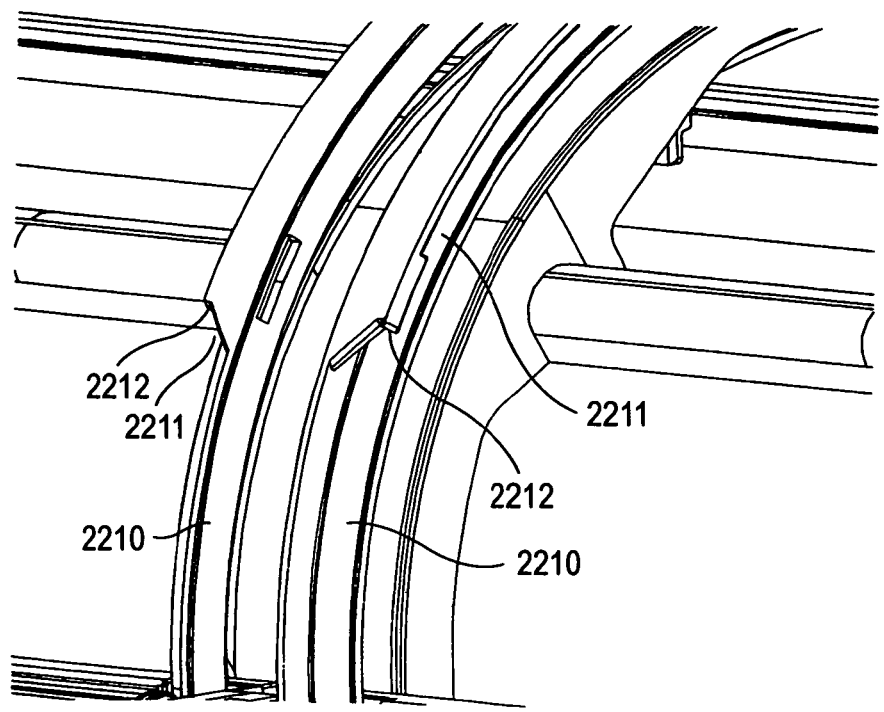
FIGS. 31A and 31B are perspective views of the main part of rail ribs attached to guide frames, respectively.
Figure 31B:
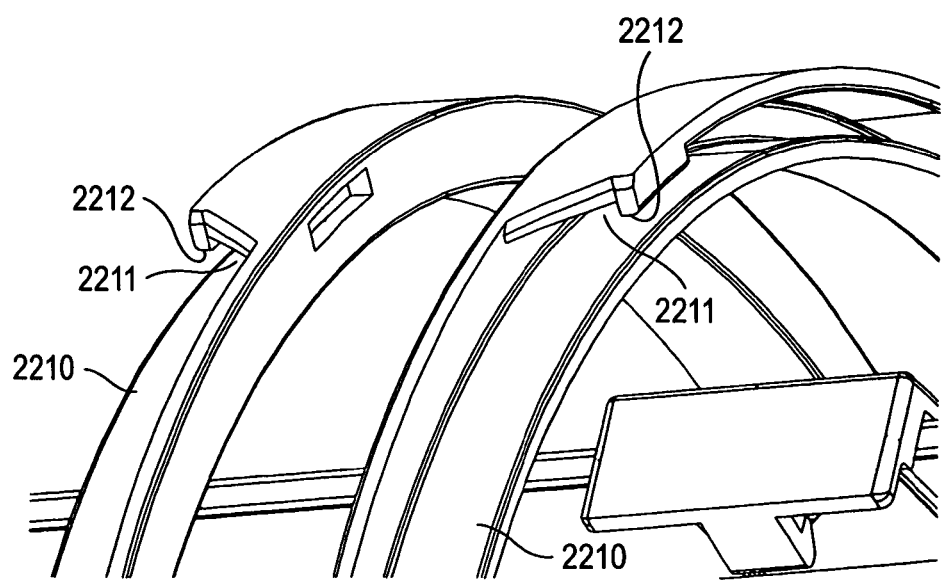

The filter take-off preventing unit which restricts deformation exceeding a predetermined quantity of the guide frame 2210, thereby preventing the air filter 2006 from being taken off in its mounting, as an example, as seen from FIG. 31, includes a rail rib 2212 continuously formed on the filter rail 2211 and a filter rib 2066 formed on the air filter 2006 so as to correspond to the rail rib 2212, as shown in FIGS. 28 to 30.

Thus, in mounting the air filter 2006, even if force acts on the guide frame 2210 so as to forcibly extend, particularly the central area thereof, since the rail rib 2212 and the filter rib 2066 are engaged with each other, deformation exceeding a predetermined quantity of the guide frame 2210 is restricted. So, there is no fear that both ends of the air filter 2006 are taken off from the filter rails 2211.

Otherwise, the filter take-off preventing unit which restricts deformation exceeding a predetermined quantity of the guide frame 2210, thereby preventing the air filter 2006 from being taken off in its mounting, as another example, as seen from FIG. 32, may be cabinet ribs 2014 each of which is projected from the upper panel 2012 of the body cabinet so as to correspond to each the filter rails 2211 and is brought into contact with the filter rail 2211 to restrict the deformation of the guide frame 2210.

Thus, in mounting the air filter 2006, even if force acts on the guide frame 2210 so as to forcibly extend, particularly the central area thereof, deformation exceeding a predetermined quantity of the guide frame 2210 is restricted by the cabinet ribs 2014. So, there is no fear that both ends of the air filter 2006 are taken off from the filter rails 2211.

Figure 32A:
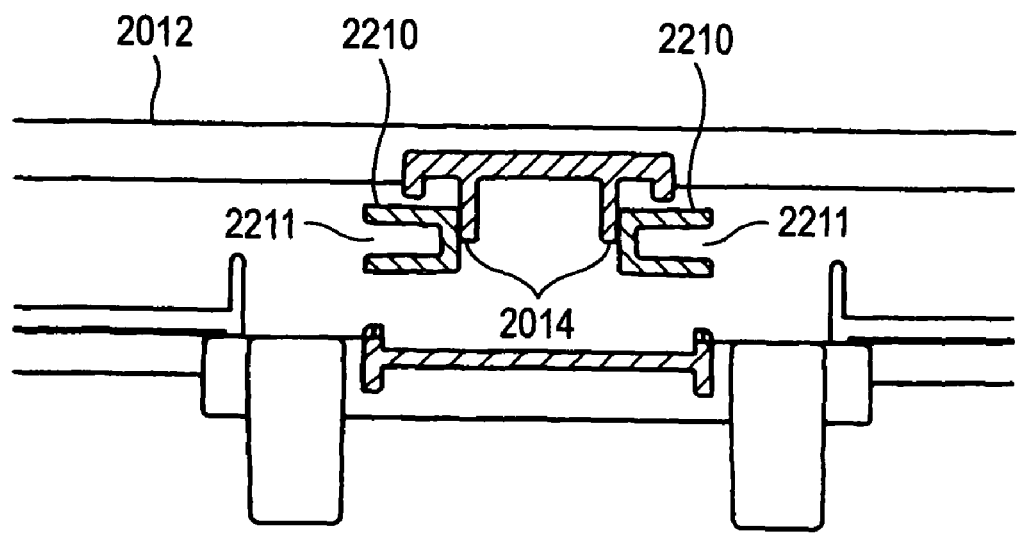
FIGS. 32A and 32B are sectional view of cabinet ribs attached to an upper panel.
Figure 32B:
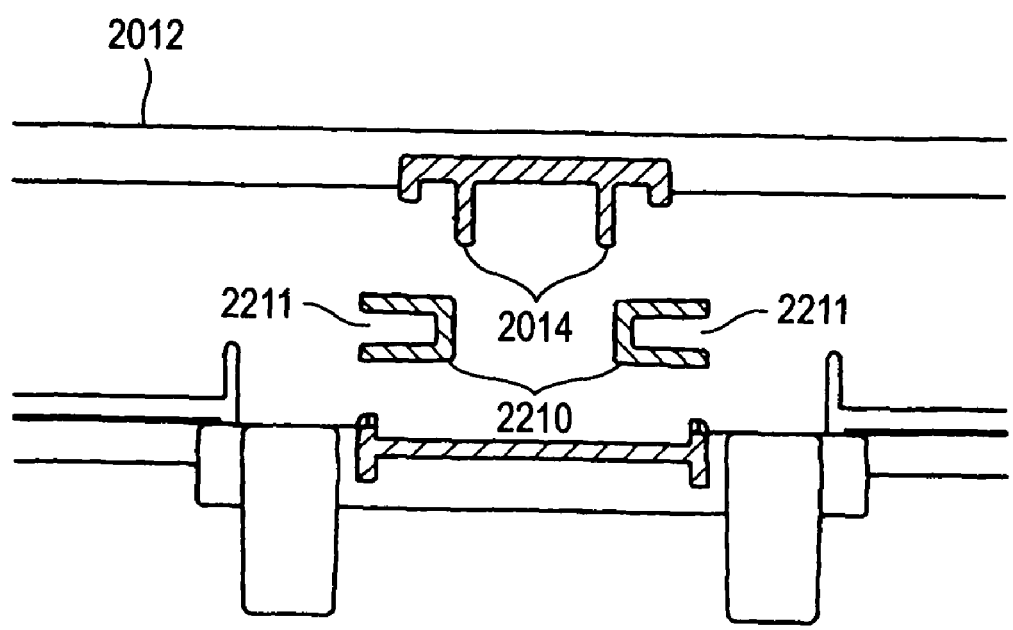

In this case, in mounting the air filter 2006, as seen from FIG. 32A, deformation exceeding a predetermined quantity of the guide frame 2210 is restricted by the cabinet ribs 2014. While the dust box 2300 is moved, as seen from FIG. 32B, as the upper panel 2012 moves upward, the cabinet ribs 2014 move from the position restricting deformation of the guide frame 2210, thereby releasing the restriction.

Incidentally, while the dust box 2300 is moved, since the air filter 2006 is being cleaned by the cleaning brush 2330, unlike while the air filter 2006 is mounted, such force as forcibly extending the central area of the guide frame 2210 does not act so that there is no fear of deformation. For this reason, the cabinet ribs 2014 may be moved from their position restricting the deformation to the position releasing the restriction.

INDUSTRIAL APPLICABILITY

This invention can be also applied to filter cleaning of a dehumidifier or an air cleaning device as well as the air conditioner. As long as the device is provided with the filter for catching dust in a blower passage formed between an air inlet and air outlet, this invention can be applied to such a device.

What is claimed is:

1. An air conditioner comprising:
   a body cabinet provided with an air inlet and an air outlet in which at least a blower fan is housed,
   a filter for dedusting, the filter having a first side and a second side opposed to the first side,
   a cleaning section for removing dust deposited on the filter, wherein the cleaning section comprises:
      a dust box for accumulating dust removed from the filter, the dust box located on the first side of the filter,
      a filter receiving plate located on the second side of the filter,
      a cleaning member for removing the dust deposited on the filter, the cleaning member rotatably supported on the first side of the filter by the dust box,
      a cleaning member rotation restricting unit located in the dust box, and
      a pressing member for pressing the second side of the filter in correspondence with the cleaning member, the pressing member supported by the filter receiving plate, and
   a moving unit for moving the cleaning section with respect to the body cabinet and the filter in a first direction and in a second direction opposite to the first direction,
   wherein the cleaning member rotation restricting unit restricts rotation of the cleaning member when the cleaning section moves in the first direction, and the cleaning member rotation restricting unit permits rotation of the cleaning member when the cleaning section moves in the second direction.

2. The air conditioner according to claim 1, further comprising:
   a main frame arranged so as to cover the blower fan, and
   a filter supporting unit for supporting the filter, a guide frame having a moving path for the cleaning section and a cleaning section moving unit for moving the cleaning section through the guide frame, which are incorporated in the main frame.

3. The air conditioner according to claim 1, further comprising:
   a control section for controlling the cleaning section and the cleaning section moving unit, wherein
   the control section drives the cleaning section regardless of the operating state of the blower fan.

4. The air conditioner according to claim 2, wherein
   the guide frame is provided to extend from the upper end to the lower end of the body cabinet, and
   the cleaning section is moved reciprocally between the upper end and lower end of the guide frame.

5. The air conditioner according to claim 1, wherein
   the cleaning section moving unit includes a driving belt driven by a predetermined driving unit.

6. The air conditioner according to claim 5, wherein
   the driving belt is taken up by two take-up reels at both ends thereof, and
   the cleaning section is moved reciprocally by reciprocally rotating the take-up reels.

7. The air conditioner according to claim 1, further comprising:
   an upper, a front, a left-side and a right-side panel as separated members, respectively, wherein
   of the panels, at least the front panel is arranged over the main frame and the front sides of the left-side and right-side panels.

8. The air conditioner according to claim 1, further comprising:
   a communicating window for removing dust accumulated within the dust box therein.

* * * * *